United States Patent
Diorio et al.

(10) Patent No.: US 7,246,751 B2
(45) Date of Patent: Jul. 24, 2007

(54) RFID TAGS CALIBRATING BACKSCATTERING PERIOD ALSO FOR NON-INTEGER DIVIDE RATIOS

(75) Inventors: Christopher J. Diorio, Shoreline, WA (US); Todd E. Humes, Shoreline, WA (US); Scott Anthony Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 64 days.

(21) Appl. No.: 11/258,521

(22) Filed: Oct. 24, 2005

(65) Prior Publication Data

US 2006/0086810 A1    Apr. 27, 2006

Related U.S. Application Data

(63) Continuation-in-part of application No. 11/114,614, filed on Apr. 25, 2005.

(60) Provisional application No. 60/622,397, filed on Oct. 26, 2004.

(51) Int. Cl.
*G06K 19/06* (2006.01)
(52) U.S. Cl. .................. 235/492; 235/451; 340/10.2
(58) Field of Classification Search ............... 235/451, 235/492; 340/10.1, 10.2, 572.1
See application file for complete search history.

(56) References Cited

U.S. PATENT DOCUMENTS

| | | | | |
|---|---|---|---|---|
| 5,453,748 A | * | 9/1995 | Lindell | 342/51 |
| 5,649,296 A | * | 7/1997 | MacLellan et al. | 455/39 |
| 5,793,324 A | * | 8/1998 | Aslanidis et al. | 342/51 |
| 2004/0150510 A1 | * | 8/2004 | Taki et al. | 340/10.1 |
| 2006/0145855 A1 | * | 7/2006 | Diorio et al. | 340/572.1 |
| 2007/0013484 A1 | * | 1/2007 | Carrender et al. | 340/10.4 |

* cited by examiner

*Primary Examiner*—Steven S. Paik
(74) *Attorney, Agent, or Firm*—Merchant & Gould; Carl K. Turk; Gregory T. Kavounas

(57) ABSTRACT

An RFID tag that receives a calibration instruction from a reader can determine the basic backscatter period of the symbols to be backscattered. According to some embodiments, when the instruction includes a calibration feature that is to be divided by a divide ratio, the tag measures the duration of the feature in terms of numbers of internal pulses, resulting in a binary L-number. Then at least two versions of the L-number (PR1-number, PR2-number) are combined, so as to yield the effective result of the division alternately, even when the divide ratio is a non-integer. The backscatter period can then be determined from the BP-number and the period of the internal pulses.

78 Claims, 19 Drawing Sheets

*RFID SYSTEM*

*RFID TAG*

*RFID SYSTEM COMMUNICATION*

SIGNAL PATH DURING R=>T

SIGNAL PATH DURING T=>R

*DERIVING DURATION OF TRcal
BY COUNTING PERIODIC EVENTS*

670

| FIELD: | COMMAND | DR | M | TRext | SEL | SESSION | TARGET | Q | CRC-5 |
|---|---|---|---|---|---|---|---|---|---|
| # OF BITS | 4 | 1 | 2 | 1 | 2 | 2 | 1 | 4 | 5 |
| E.G. | 1000 | 1 | 01 | 0 | 01 | 10 | 1 | 0100 | 10110 |

FIGURE 6C

*DETERMINING THE DR AND THE M FROM THE QUERY COMMAND*

675

| CODE FOR M | M VALUE |
|---|---|
| 00 | 1 |
| 01 | 2 |
| 10 | 4 |
| 11 | 8 |

FIGURE 6E

*DECODING M*

674

| CODE FOR DR | DR |
|---|---|
| 0 | 8 |
| 1 | 64/3 ← 649 |

FIGURE 6D

*DECODING DR*

DATA ENCODING
PERIODICITIES AND SCHEMES

| | PR1/L | PR2/L | INT/L | BP/INT | BP/L | ACHIEVED DR L/BP |
|---|---|---|---|---|---|---|
| | ... | ... | ... | ... | ... | ... [FIG. 9] |
| RG1 | k1 | k2 | k1+k2 | k3 | (k1+k2) x k3 | 1/[(k1+k2)xk3] |
| RG2 | 1 (no 905) | k2 | 1+k2 | k3 | (1+k2) x k3 | 1/[(1+k2)xk3] |
| RG3 | k1 | 1 (no 907) | k1+1 | k3 | (k1+1) x k3 | 1/[(k1+1)xk3] |
| RG4 | k1 | k2 | k1+k2 | 1 (no 914) | k1+k2 | 1/(k1+k2) |
| | ... | ... | ... | ... | ... | ... |
| RS1 | $2^m$ (m intg) | $2^n$ (n intg) | $2^m+2^n$ | $2^p$ (p intg) | $(2^m+2^n)$ x $2^p$ | 1/[$(2^m+2^n)$x$2^p$] |
| RS2 | 1 (no 905) | $2^n$ (n intg) | $1+2^n$ | $2^p$ (p intg) | $(1+2^n)$ x $2^p$ | 1/[$(1+2^n)$x$2^p$] |
| RS3 | $2^m$ (m intg) | 1 (no 907) | $2^m+1$ | $2^p$ (p intg) | $(2^m+1)$ x $2^p$ | 1/[$(2^m+1)$x$2^p$] |
| RS4 | $2^m$ (m intg) | $2^n$ (n intg) | $2^m+2^n$ | 1 (no 914) | $2^m+2^n$ | 1/$(2^m+2^n)$ → [FIG.11] |
| | ... | ... | ... | ... | ... | ... |

*ACHIEVABLE DIVIDE RATIOS*

FIGURE 10A

| | PR1 / L | PR2 / L | INT / L | BP / INT | BP / L | ACHIEVED DR L / BP |
|---|---|---|---|---|---|---|
| | ... | ... | ... | ... | ... | ... |
| RP1 | k0 (k0 intg) | k0 / 2 | k0 x 3/2 | 1/(32 x k0) | 3/64 | 64/3 |
| RP2 | 1 (no 905) | 1/2 | 3/2 | 1/32 | 3/64 | 64/3 |
| RP3 | 2 | 1 (no 907) | 3 | 1/64 | 3/64 | 64/3 |
| RP4 | 1/32 [= $2^{-5}$] | 1/64 [= $2^{-6}$] | 3/64 | 1 (no 914) | 3/64 | 64/3 |
| | ... | ... | ... | ... | ... | ... |
| RPN | | -1 (subtract) | 3 | 1/64 | 3/64 | 64/3 |
| | ... | ... | ... | ... | ... | ... |
| RE1 | k0 (k0 intg) | k0 | k0 x 2 | 1/(16 x k0) | 1/8 | 8 |
| RE2 | 1/16 [= $2^{-4}$] | 1/16 [= $2^{-4}$] | 1/8 | 1 (no 914) | 1/8 | 8 |
| | ... | ... | ... | ... | ... | ... |

1020

[FIG.12A, FIG. 12B] → (RP4 row)

[FIG.15] → (RE2 row)

*ACHIEVABLE DIVIDE RATIOS*

| n | m | SET OF DRs |
|---|---|---|
| -2 | {-1,-2} | {4/3, 2} |
| -3 | {-1,-2,-3} | {8/5, 8/3, 4} |
| -4 | {-1,-2,-3,-4} | {16/9, 16/5, 16/3, 8} |
| -5 | {-1,-2,-3,-4,-5} | {32/17, 32/9, 32/5, 32/3, 16} |
| -6 | {-1,-2,-3,-4,-5,-6} | {64/33, 64/17, 64/9, 64/5, 64/3, 32} |

*EXAMPLE n & m VALUES AND CORRESPONDING DRs*

RFID TAGS CALIBRATING BACKSCATTERING PERIOD ALSO FOR NON-INTEGER DIVIDE RATIOS

RELATED APPLICATIONS

This utility patent application is a continuation-in-part (CIP) of U.S. patent application Ser. No. 11/114,614 (IMPJ-0136) filed on Apr. 25, 2005. The benefit of the earlier filing date of the parent application is hereby claimed under 35 U.S.C. §120.

This application also claims the benefit of U.S. Provisional Application Ser. No. 60/622,397, filed on Oct. 26, 2004, which is hereby claimed under 35 U.S.C. §119(e). The parent application and the provisional application are incorporated herein by reference.

TECHNICAL FIELD

The present invention relates to Radio Frequency IDentification (RFID) systems; and more particularly, to RFID tags and methods for employing non-integer divide ratios in RFID communications.

BACKGROUND

Radio Frequency IDentification (RFID) systems typically include RFID tags and RFID readers (the former are also known as labels or inlays, and the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted-back RF wave either originally, or by reflecting back a portion of the interrogating RF wave, in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags.

The tag can control the periodicity of the symbols it backscatters. In other words, it can control the basic backscatter period it uses, along with the encoding scheme. In a number of embodiments, the reader transmits an instruction about the periodicity, and the tag follows the instruction. In some instances, the instruction as it pertains to the basic backscatter period calls for a division by a non-integer, which the tag can follow by implementing cumbersome circuitry, with concomitant penalties in die area, chip power, and eventual chip performance and cost.

SUMMARY

The invention provides RFID tags and methods that determine the basic backscatter period of the symbols to be backscattered, from the instruction sent by the RFID reader. According to some embodiments, when the instruction includes a calibration feature that is to be divided by a divide ratio, the tag measures the duration of the calibration feature in terms of numbers of internal pulses, resulting in an L-number. Then at least two versions of the L-number are combined to derive a new BP-number, thus yielding the effective result of the division by the divide ratio in an alternative manner. The backscatter period can then be determined from the BP-number and the period of the internal pulses. The determination can be substantially exact, even when the divide ratio is a non-integer.

It will be appreciated that combining is a process that requires fewer components for the tag to implement than, for example, a process of looking up the division of the L-number by the non-integer divide ratio in a table of possible dividends.

This and other features and advantages of the invention will be understood from the Detailed Description and the Drawings, in which:

BRIEF DESCRIPTION OF THE DRAWINGS

FIG. 6C is a table showing the fields of a sample "Query" command;

FIG. 6D is a lookup table for an embodiment of decoding from the fields of FIG. 6C a value for a divide ratio DR to be used in a determination window of FIG. 6A;

FIG. 6E is a lookup table for an embodiment of decoding from the fields of FIG. 6C a value for a variable M;

FIGS. 10A and 10B are portions of a table illustrating divide ratios (DRs) achievable by proper design of the divider of FIG. 9 according to embodiments;

FIG. 11 is a table illustrating particular achievable divide ratios (DRs) according to certain row of the table of FIG. 10 where the factors are powers of 2;

DETAILED DESCRIPTION

Figure 1:
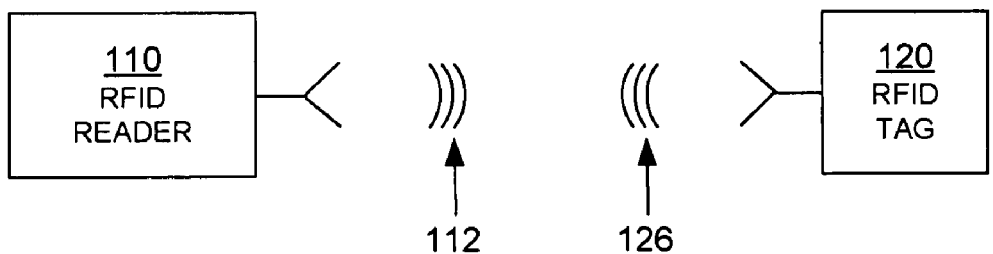
FIG. 1 illustrates a typical RFID system with an RFID reader and an RFID tag.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

FIG. 1 is a diagram of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a delimiter, a calibration symbol, and so on. Further symbols can be implemented for exchanging binary data, such as "0" and "1".

Tag 120 can be a passive tag or an active tag, i.e. having its own power source. Where tag 120 is a passive tag, it is powered from wave 112.

Figure 2:
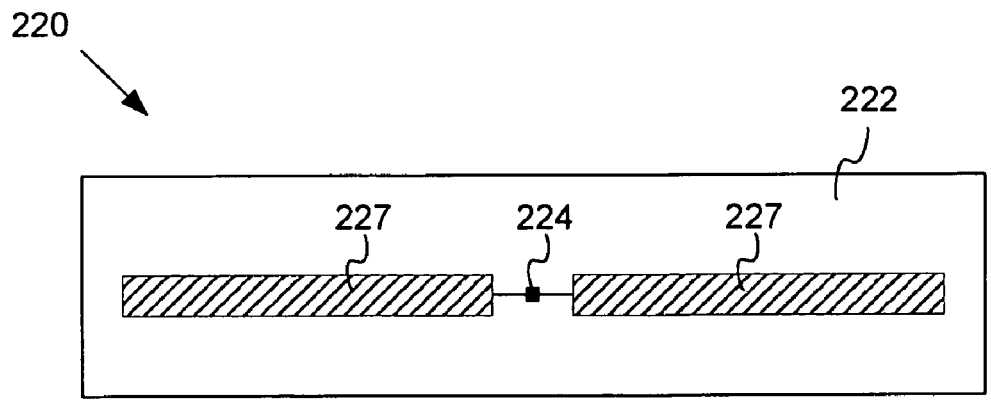
FIG. 2 is a diagram of an RFID tag such as the RFID tag shown in FIG. 1.

FIG. 2 is a diagram of an RFID tag 220. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
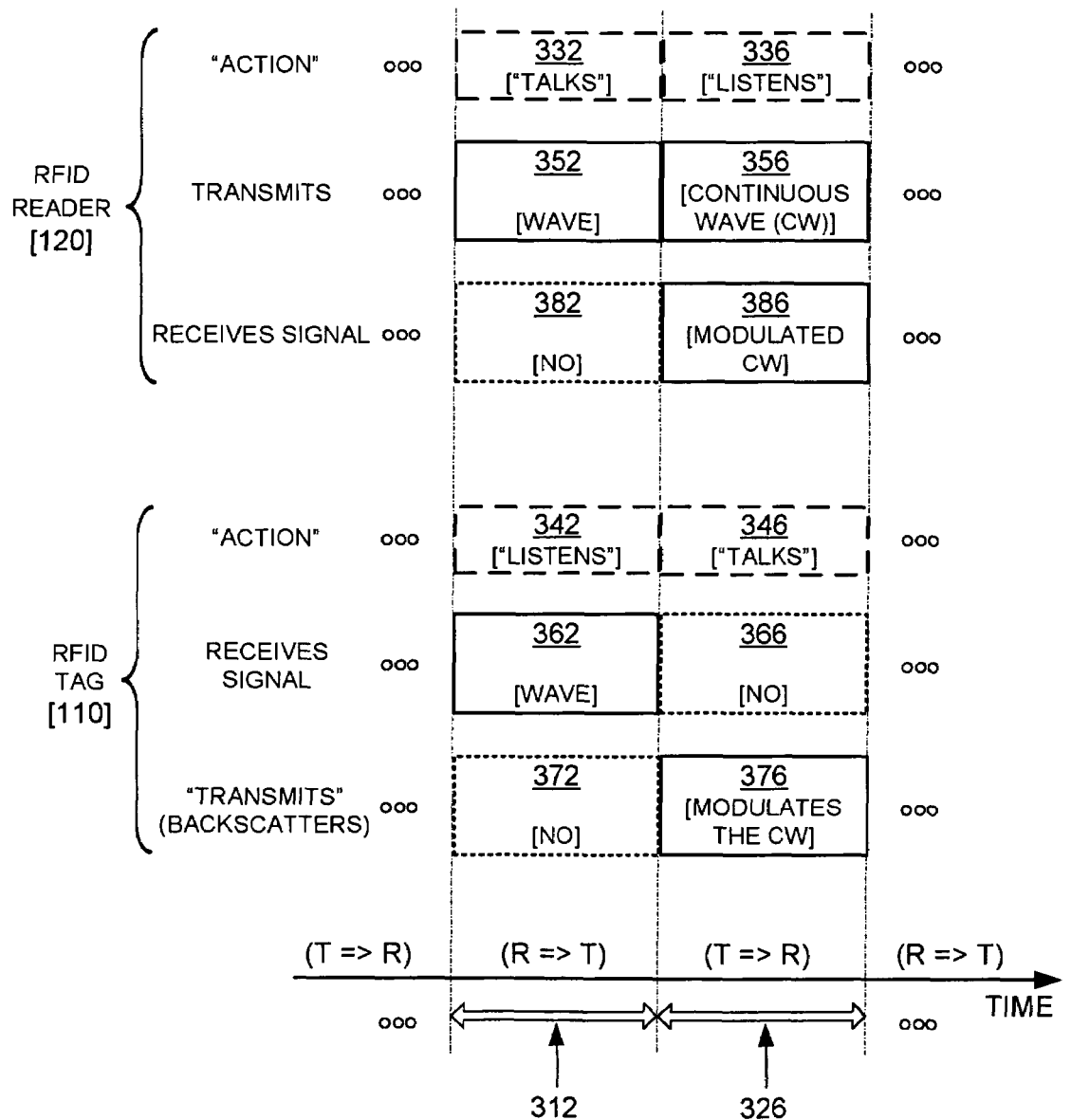
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course intervals 312, 326 can be of different durations—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
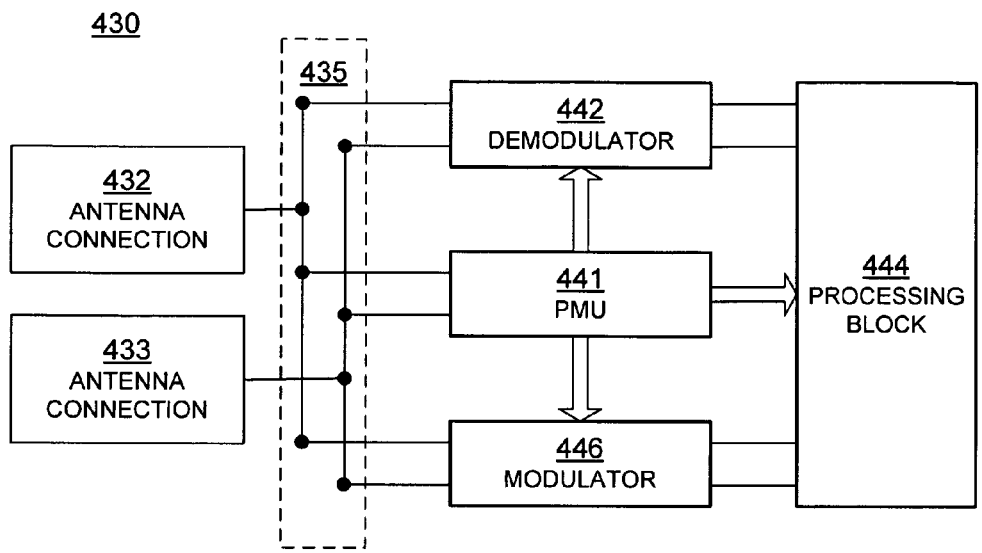
FIG. 4 is a block diagram illustrating one embodiment of an electrical circuit that may be employed in an RFID tag such as the RFID tag of FIG. 1.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session. The treatment of a signal is described below.

Figure 5A:
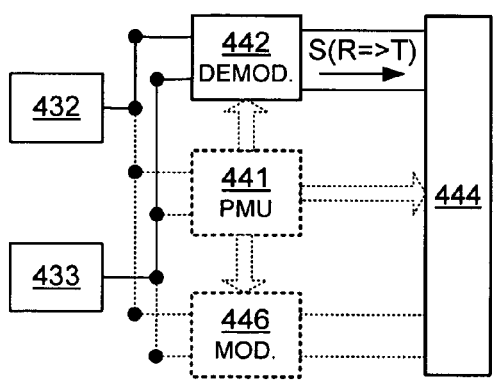
FIGS. 5A and 5B illustrate two versions of the electrical circuit of FIG. 4 emphasizing signal flow in receive and transmit operational modes of the RFID tag, respectively.

FIG. 5A shows version 530-A of circuit 430 of FIG. 4. Version 530-A shows the components of circuit 430 for a tag, further modified to emphasize a signal operation during a R→T session (receive mode of operation) during time interval 312 of FIG. 3. An RF wave is received from antenna connections 432, 433, a signal is demodulated from demodulator 442, and then input to processing block 444 as S(R→T). In one embodiment according to the present invention, S(R→T) may include a received stream of symbols. It is during this operation that the tag may receive the instructions as to what backscatter period to use.

Version 530-A shows as relatively obscured those components that do not play a part in processing a signal during a R→T session. Indeed, PMU 441 may be active, and may be converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
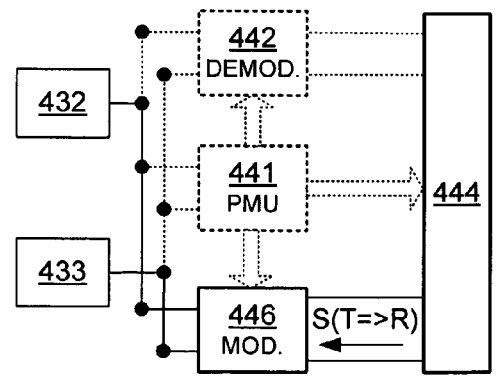

FIG. 5B shows version 530-B of circuit 430 of FIG. 4. Version 530-B shows the components of circuit 430 for a tag, further modified to emphasize a signal operation during a T→R session during time interval 326 of FIG. 3. A signal is output from processing block 444 as S(T→R). In one embodiment according to the present invention, S(T→R) may include a transmission stream of symbols. S(T→R) is then modulated by modulator 446, and output as an RF wave via antenna connections 432, 433.

Version 530-B shows as relatively obscured those components that do not play a part in processing a signal during a T→R session. Indeed, PMU 441 may be active, and may be converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6A:
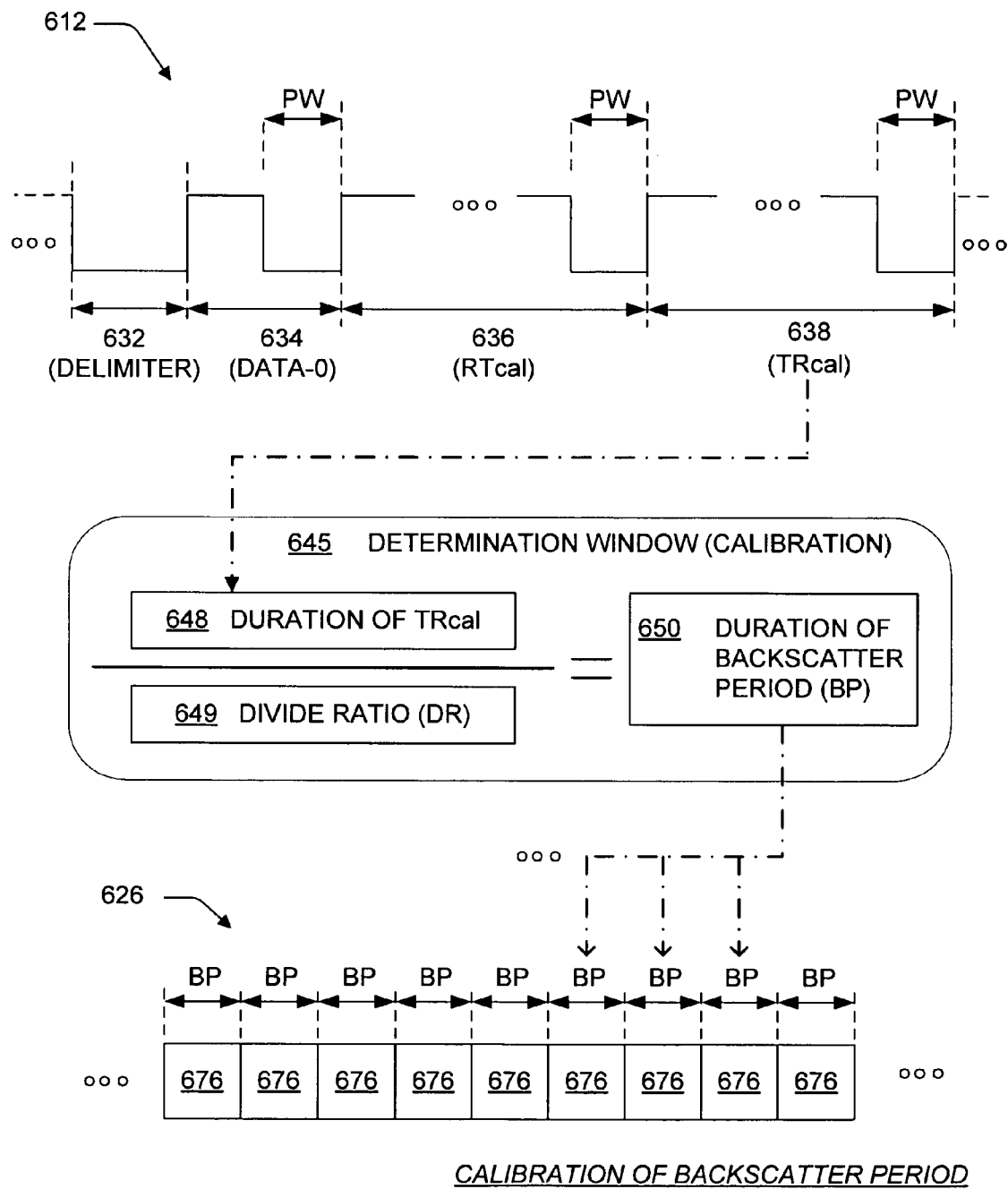
FIG. 6A is a collection of diagrams showing how a backscatter period of a tag is expected to be calibrated in response to a wave transmitted by a reader.

FIG. 6A is a collection of diagrams showing how a backscatter period of a tag is expected to be calibrated in response to an instruction by a reader. The diagrams are a reader-to-tag waveform 612, a determination window 645, and a tag-to-reader block-form waveform 626.

A waveform 612 may be a feature of a first wave 112, as received by tag 120. Waveform 612 may be received by the tag during time interval 312, and especially during a calibration event. Ultimately waveform 612 is received by a demodulator, such as demodulator 442 of FIG. 4.

Waveform 612 includes symbols that encode information. Each symbol may include a high portion followed by a terminating low pulse, denoted as PW. For purposes of illustration, all the PWs shown in FIG. 6 have the same duration; in actual practice, however, the lengths need not be the same.

In one embodiment, waveform 612 begins with delimiter portion 632, which may indicate to the tag the start of the calibration waveform. Delimiter portion 632 is followed by a data portion 634, which includes one or more data symbols. Only one such symbol is shown in the example of FIG. 6, namely a "data-0".

Data portion 634 is followed by one or more portions whose duration conveys additional calibration information. Processing block 444 of FIG. 4 may use these additional portions to calibrate accordingly one or more tag functions.

One such RTcal portion 636 conveys, by its own duration, a parameter that is to be used for calibrating R→T symbol decoding. Only one RTcal portion 636 is shown in the example FIG. 6, although more could be used.

Another such TRcal portion 638 follows RTcal 636. In the shown embodiment, TRcal 638 includes a high period of variable length, followed by a PW. TRcal portion 638 conveys, by its own duration, a parameter to be used by a tag to determine its backscatter period during T→R signaling.

Determination window 645 is used during calibration of the backscatter period. When a tag learns a duration 648 of TRcal portion 638, it divides duration 648 by a Divide Ratio (DR) 649. The DR is determined as is described later in this document. The result of the division is a duration 650 of the tag backscatter period (BP). As will be seen below, circuits and tags described in this document perform the division efficiently even when the DR is not an integer.

Block-form waveform 626 may be a feature of wave 126 backscattered by the tag. Waveform 626 may be transmitted by the tag during time interval 326, and typically after the above-described calibration event. Ultimately waveform 626 is generated by a modulator such as modulator 446 of FIG. 4. Waveform 626 includes successive segments 676. Each segment 676 has a duration equal to the backscatter period BP as determined in determination window 645. Symbols, such as data-0 and data-1, are encoded within or across segments 676 for backscattering.

In reviewing FIG. 6A, calibration is performed by performing the division within determination window 645. Elements of the division are now described.

In the division of window 645, the numerator is duration 648 of feature TRcal 638, and the divisor is the divide ratio DR. Duration 648 is first converted to a number, for example by counting the number of periodic tag events such as pulses during feature TRcal 638. This number is called the L-number, and it can be expressed in binary form. Second, the L-number is divided by the divide ratio DR to yield the BP-number. The BP-number is the number of the above-mentioned periodic tag events in backscatter period BP. It will be observed that, advantageously, the calibration procedure does not depend on the length of the periodic tag events.

Figure 6B:
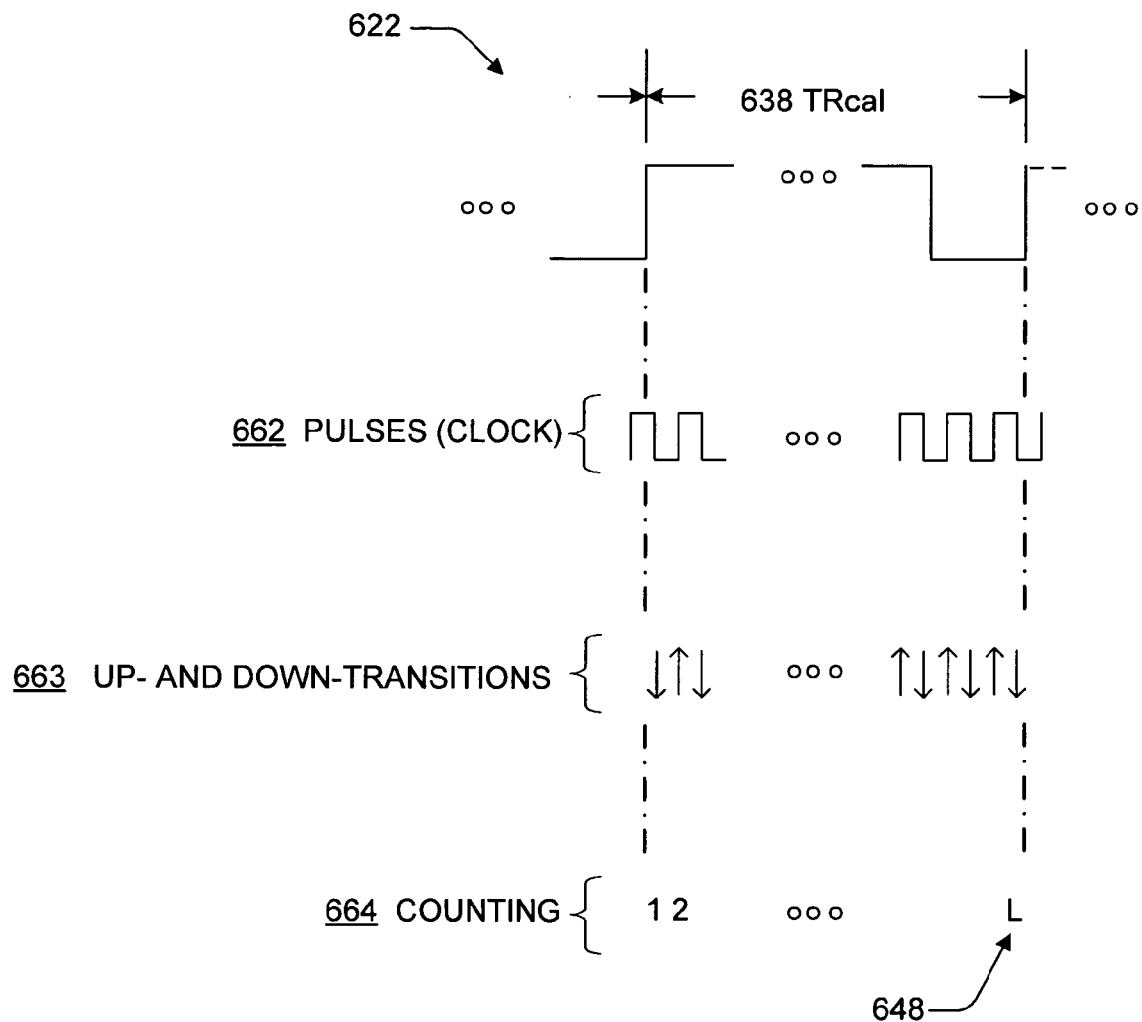
FIG. 6B is a conceptual diagram showing how a duration of a TRcal feature of FIG. 6A can be measured in terms of an L-number of clock transitions according to embodiments.

FIG. 6B is a conceptual diagram showing how a duration 648 of a TRcal feature 638 of FIG. 6A can be measured in terms of the L-number of periodic tag events according to embodiments.

First, a portion 622 of waveform 612 of FIG. 6A includes a calibration feature, namely TRcal 638.

Second, during TRcal 638, a train of pulses 662 may be received. Pulses 662 are preferably periodic, and can be output by a clock (not shown). Pulses 662 are depicted as square-wave pulses, but the pulses can have a different shape or duty cycle. In fact, they need not be square at all, but can also be sinusoidal, triangular, and the like. For this example, a square-wave is assumed with no loss of generality.

Third, transitions 663 of pulses 622 are considered alone. Transitions 663 are both the up-transitions and down-transitions of pulses 662, at least during the duration of TRcal 638. In other embodiments, only the up transitions or only the down transitions are considered. In embodiments where pulses 662 were sinusoidal, zero crossings could be considered instead, and so on.

Fourth, a series of numbers 664 merely counts considered transitions 663. Counting can begin at the start of TRcal 638, and counting can end at the end of TRcal 638 with the number L, also known as the L-number. The L-number therefore represents the duration 648 of TRcal 638. It is preferred that the L-number be expressed in binary form.

The rate of the T→R signaling can depend on the L-number, the divide ratio DR, and/or the value of a variable M. Of those, the L-number will be divided by the DR, and the M will determine the encoding scheme, as will be described below.

Either or both of DR and the variable M can be known by the tag. They can, for example, be stored in a memory of the tag, such as a volatile or nonvolatile memory. An example is now given where DR and M are communicated by an RFID reader. In this example, DR and M are encoded are encoded in a "Query" command, which is sent to the tag.

FIG. 6C is a table 670 showing fields of a "Query" command. These fields are the same as shown for a "Query" command in the Specification for RFID Air Interface—EPC™ Radio-Frequency Identity Protocols Class-1 Generation-2 UHF RFID Protocol for Communications at 860 MHz-960 MHz, as ratified by EPCglobal™. This particular specification is also colloquially known as the "Gen2 Spec". EPCglobal is an organization that maintains a website at: <http://www.epcglobalinc.org/> at the time this document is initially filed with the USPTO.

In table 670, the first row gives the names of the fields of the "Query" command. It can be observed that fields for both DR and M are included. The second row lists the number of bits assigned to each field. The third row illustrates example values for each of the fields.

FIG. 6D is a lookup table ("LUT") 674 for one embodiment of decoding from the command of FIG. 6C the divide ratio DR to be used in FIG. 6A. In the example of table 674, the bit encoded in the "Query" command gives the DR value 649 to be used in determination window 645.

In table 674, an encoded "0" means the tag should use a DR of 8. To perform division by 8, three Least Significant Bits (LSBs) can be removed from the L-number, in an operation known as "integer division by truncation".

In table 674, an encoded "1" means the tag should use a DR of 64/3. To perform such a non-integer the division, the tag may use a LUT. The tag can use the L-number as an index into the LUT, and the output of the LUT can be the symbol backscatter period BP. Unfortunately, if the range of the L-numbers is large, the LUT needs to be also large, using valuable silicon area.

FIG. 6E is a LUT 675 for one embodiment of decoding from the command of FIG. 6C the M value to be used during backscattering. In this example, the two-bit encoding is 01, which is looked up as value 2.

Figure 7A:
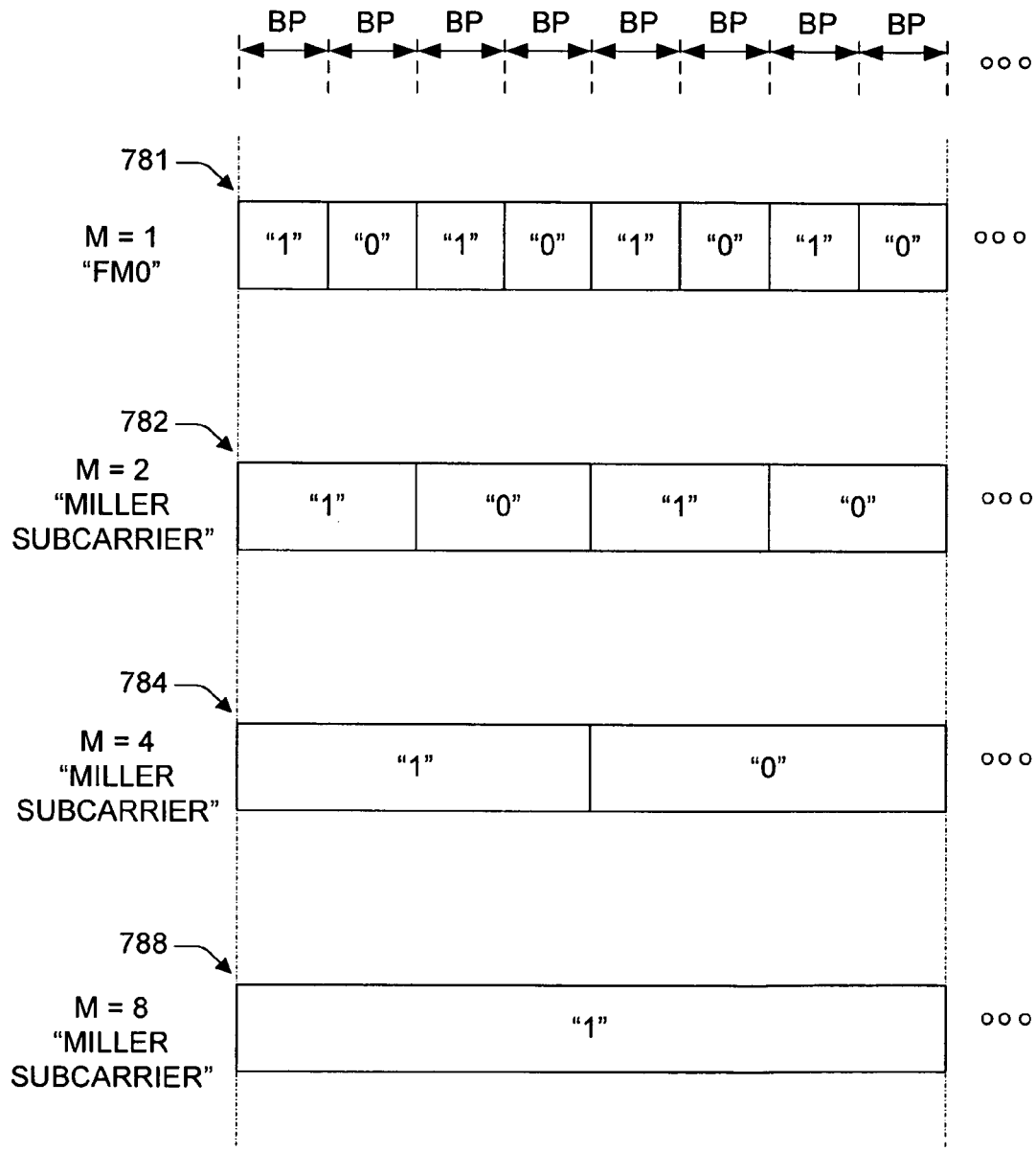
FIG. 7A is a collection of diagrams showing how the periodicity of data encoding can be defined with respect to the backscatter period determined in FIG. 6A, and the choice of data encoding schemes can be defined with respect to a variable M decoded according to FIG. 6E.

FIG. 7A is a collection of diagrams showing how data to be backscattered can be encoded according to different encoding schemes. The schemes are denoted according to different values of the variable M, which here takes one of the values of 1, 2, 4, and 8. The schemes are also the same as in the above-mentioned Gen2 spec.

Figure 7B:
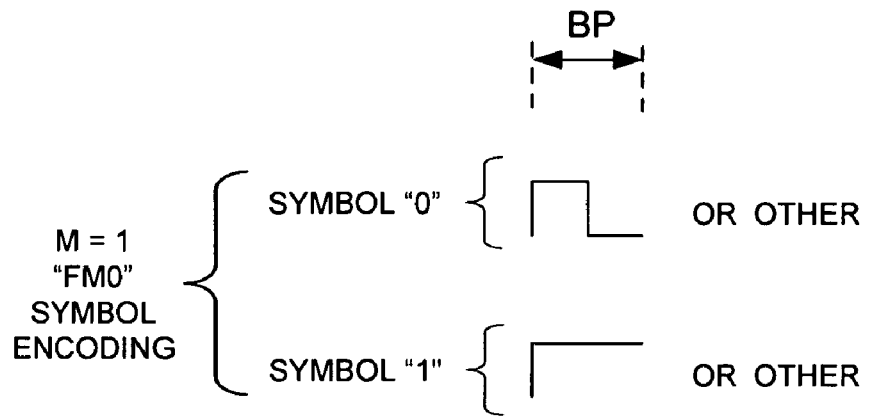
FIG. 7B shows sample waveforms for encoding data according to an FM0 encoding scheme of FIG. 7A that corresponds to M=1.

Waveform 781 illustrates an encoding scheme that corresponds to M=1, and is also known as FM0. Waveform 781 includes successive segments 676, each with a duration equal to the backscatter period BP. Referring briefly to FIG. 7B, sample waveform segments are shown for encoding data, also known as symbols, according to the FM0 encoding scheme.

Returning to FIG. 7A, FM0 encoding is efficient, but may be susceptible to interference. That is why a different encoding can also used, known as Miller Subcarrier. Miller Subcarrier may be slower than FM0, but can work better in environments having RF noise. Miller Subcarrier allows readers to more easily separate a tag's response from noise and from other readers.

Figure 7C:
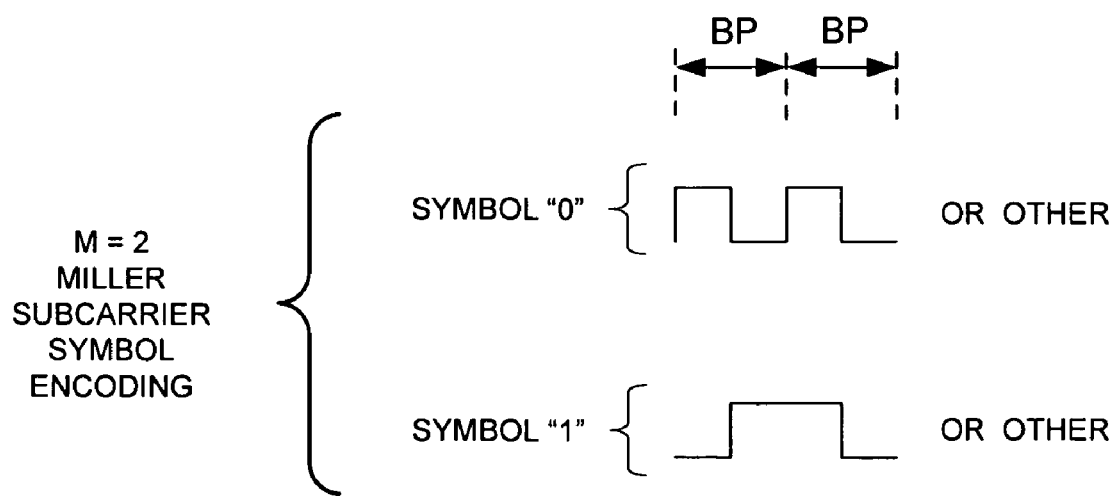
FIG. 7C shows sample waveforms for encoding data according to a Miller Subcarrier encoding scheme of FIG. 7A that corresponds to M=2.

Waveform 782 illustrates segments encoded according to Miller Subcarrier with M=2. As the figure shows, the time period for each segment is twice the period for M=1. Referring briefly to FIG. 7C, sample waveform segments are shown for encoding data according to the Miller Subcarrier encoding scheme with M=2.

Figure 7D:
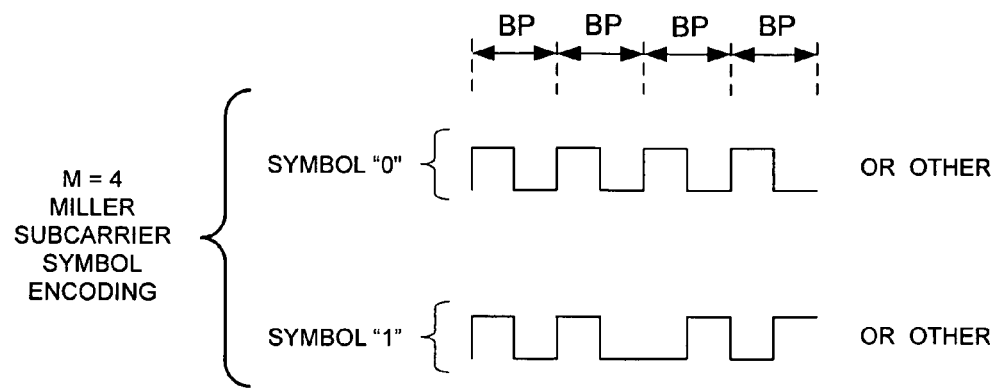
FIG. 7D shows sample waveforms for encoding data according to a Miller Subcarrier encoding scheme of FIG. 7A that corresponds to M=4.

Returning to FIG. 7A, waveform 784 is formed by encoding according to Miller Subcarrier with M=4, where the time period for each segment doubles again (four times the period of waveform 781 for M=1). Referring briefly to FIG. 7D, sample waveform segments are shown for encoding data according to the Miller Subcarrier encoding scheme with M=4.

Figure 7E:
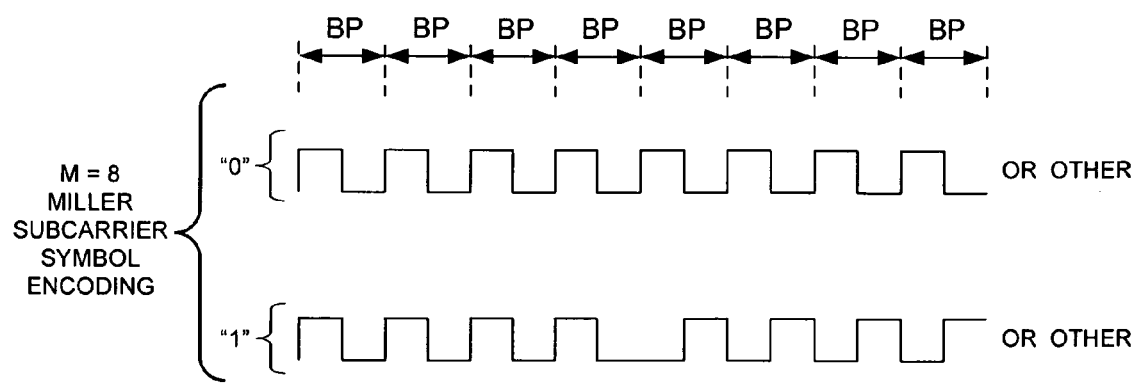
FIG. 7E shows sample waveforms for encoding data according to a Miller Subcarrier encoding scheme of FIG. 7A that corresponds to M=8.

Returning to FIG. 7A, waveform 788 is an example of encoding symbols according to Miller Subcarrier with M=8, where the time period for each segment is eight times the time period for waveform 781 with M=1. Referring briefly to FIG. 7E, sample waveform segments are shown for encoding data according to the Miller Subcarrier encoding scheme with M=8.

It will be understood that the labels L-number, BP-number, TRcal, along with the later introduced PR1-number, PR2-number, etc., are just that, merely labels used in this document to represent items or quantities. Other labels can be used for the same items, whether they are numbers, waveform features, etc.

Figure 8:
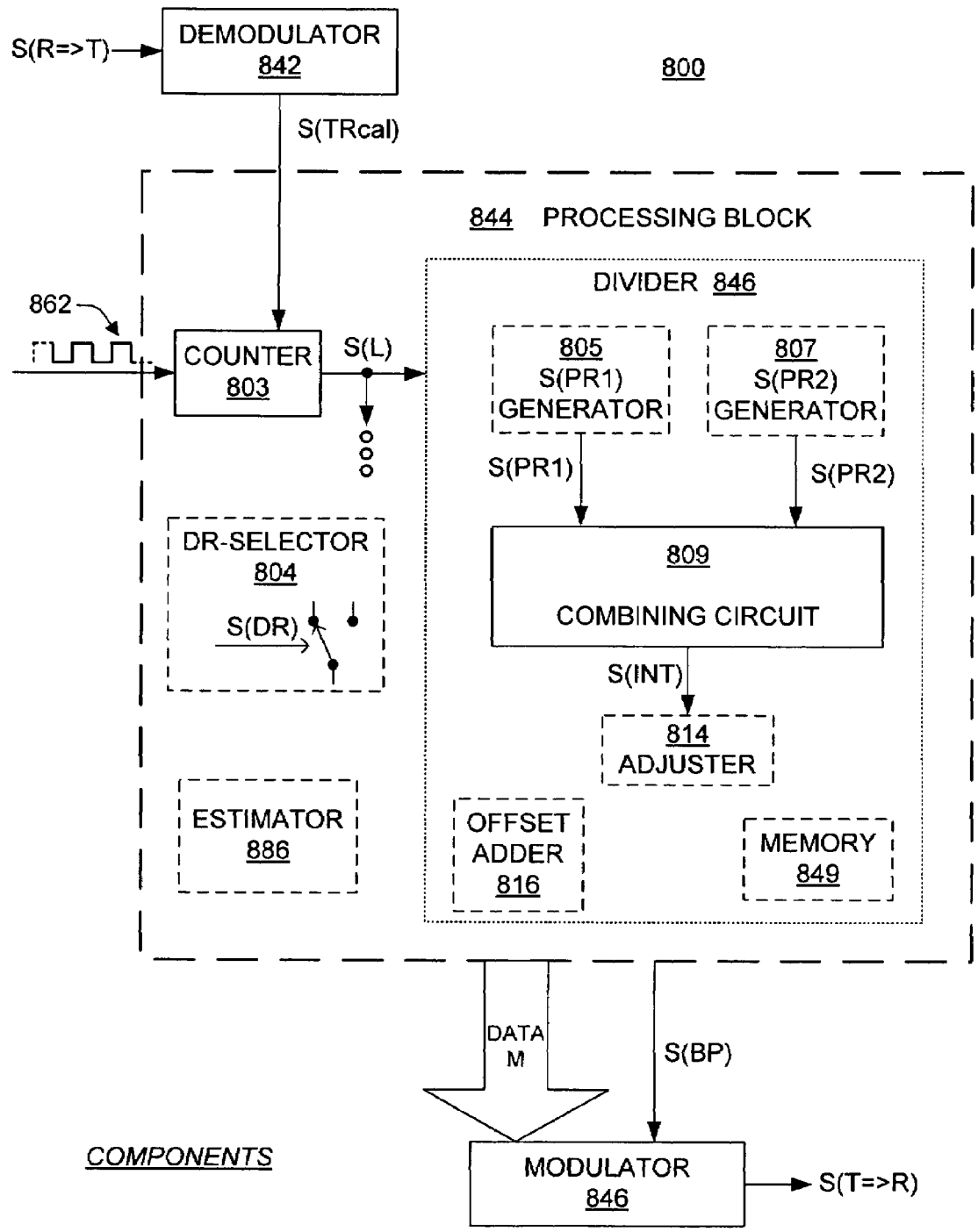
FIG. 8 is a partial block diagram of components of a circuit such as the circuit of FIG. 4 for performing the calibration of FIG. 6A according to embodiments.

FIG. 8 is a partial block diagram of components 800 of a circuit of an RFID tag. Components 800 can be, for example, those of circuit 430 of FIG. 4. As will be seen, embodiments of components 800 can be used to perform the calibration of FIG. 6A.

Components 800 include a demodulator 842, a processing block 844, and a modulator 846, which can be coupled as shown in circuit 430. When an antenna (not shown in FIG. 8) receives wireless wave 112, demodulator 842 is capable of demodulating a waveform 612 out of wave 112.

Waveform 612 includes calibration feature 638 TRcal. In some embodiments demodulator 842 can further convey calibration feature 638 TRcal, such as via a signal S(TRcal).

Processing block 844 is capable of determining a BP-number as described in more detail below. Determining is performed from calibration feature 638 TRcal, as conveyed from demodulator 842. As per the above, the BP-number corresponds to a backscatter duration. Processing block 844 can further convey the determined BP-number, such as via a signal S(BP). In embodiments where the BP-number is binary, signal S(BP) can convey the bits serially, in parallel, etc.

In addition, processing block 844 is capable of outputting other elements for communicating back to the reader by backscattering. These include symbols or data to be communicated, along with a variable M related to encoding of periodicity, and so on.

Modulator 846 is arranged to modulate a backscattered wave 126 that may include symbols conveyed from processing block 844. The symbols are encoded so as to have a backscatter periodicity, also known simply as periodicity, determined from the BP-number and the variable M. The BP-number and the variable M can be conveyed by processing block 844 to modulator 846.

In a number of embodiments, variable M assumes a value from a set that includes the numbers 1, 2, 4, and 8. Then the backscattered symbols can be encoded with the backscatter periodicity shown in FIG. 7A of this document, according to the assumed value of the variable M.

The value of variable M can be learned in a number of ways. In some embodiments, as described above, it can be learned by decoding wave 112. For example, processing block 844 can include a decoder (not shown), which is configured to decode the waveform of another portion of wave 112 to determine a value for the variable M. Determining can be as, for example, is shown in FIG. 6E. Or it can be determined by sensing the amount of local interference, and so on.

In other embodiments, a memory can be included that is adapted to store a value of the variable M. The stored value can be looked up as needed. It can be fixed, such as from the manufacturer, or updated, such as from decoding a portion of wave 112 as per the above.

Processing block 844 is now described in more detail. While different components will be described as discrete, it will be understood by the person skilled in the art that some of them can be advantageously implemented together.

In a number of embodiments, processing block 844 includes a counter 803. Counter 803 can include a sampler, a register, a counter, and so on. Counter 803 is configured to determine an L-number from a duration of the above described calibration feature TRcal 638.

Once determined, the L-number can be conveyed in a number of ways. One such way is by an electrical signal S(L), similar to what was described for signal S(BP). Counter 803 may also include a storing circuit to store the L-number.

In one embodiment, counter 803 is arranged to receive a train of substantially periodic pulses 862, similar to pulses 662 described above. Counter 803 then counts features of the pulses 862 during the calibration feature, to derive the L-number. In this embodiment, the features include transitions 663, which are both the up-transitions and down-transitions of pulses 862, although either one of the types of transitions would be enough. Then the L-number is derived as per counting 664.

Processing block 844 moreover includes a divider 846. Divider 846 can determine the BP-number in response to the L-number in at least one way. Divider 846 can be implemented as is described later in this document.

Processing block 844 optionally also includes a selector 804 that is also known as DR-selector. Selector 804 can be set to establish a computation setting out of at least two available computation settings, as if it were a switch. The established computation setting guides how block 844 determines the BP-number. Two different settings would yield different results for the BP-number, as will be shown below.

In some embodiments, selector 804 includes one or more multiplexers for guiding the determination of the BP-number. The setting(s) of the multiplexers is determined by which one of the available computation settings is established by selector 804.

Selector 804 chooses which computation setting to establish according to a divide ratio DR that will be used for determining the BP-number. Selector 804 is particularly advantageous where different divide ratios can be called for. The divide ratio DR that is to be used can be determined in any number of ways, and conveyed internally by a signal, such as signal S(DR). In some embodiments, divide ratio DR is determined as shown from FIG. 6D. For example, the first choice can effectuate a divide ratio DR of 64/3, and the second choice can effectuate a divide ratio DR of 8. In those cases, block 844 can further include a decoder (not shown) that is configured to decode a portion of a waveform of wave 112 to determine divide ratio DR. The decoder can communicate in any number of ways, such as by generating signal S(DR), and so on.

As stated above, selector 804 can be implemented within block 844, so that the choice of selector 804 guides how block 844 determines the BP-number. This can be implemented in a number of ways, and two such ways are described by way of example and not of limitation.

First, in some embodiments, divider 846 is adjustable, as will be illustrated in more detail later in this document. Selector 804 includes one or more multiplexers that affect how divider 846 operates, and therefore divider 846 yields a different result depending on the established setting. The point is that divider 846 will be used for deriving different results for the BP-number. Advantageous implementations are where a first result is a non-integer divide ratio, such as 64/3, and the second result is an integer divide ratio, such as 8.

Second, in other embodiments, block 844 further includes an estimator 886 that is distinct from divider 846, and which can determine the BP-number in response to the L-number in at least one way. So, selector 804 can be designed so that the first computation setting is for block 844 to determine the BP-number using divider 846, and the second computation setting is for block 844 to determine the BP-number using estimator 886. This is particularly suitable where divider 846 can be used to determine for a DR of 64/3, and estimator 886 can determine for a DR of 8. The latter can be, for example by deleting the last three LSBs of the L-number, such as is described for example in copending U.S. patent application Ser. No. 11/114,614.

Divider 846 is now described in more detail.

Divider 846 includes a combining circuit 809. Circuit 809 is configured to combine a first nonzero version of the L-number with a second nonzero version of the L-number. This derives a BP-number such that the derived BP-number substantially equals the L-number divided by the divide ratio DR. This is implemented advantageously where the divide ratio DR is a non-integer, such as 64/3. The first nonzero version of the L-number is also known as the PR1-number, and the second nonzero version of the L-number is also known as the PR2-number. Many options for the PR1-number and the PR2-number are possible, as described later in this document. Circuit 809 can receive the PR1-number and the PR2-number in a number of ways, such as conveyed by respective signals S(PR1) and S(PR2). Signals S(PR1) and S(PR2) can be configured as was described for signal S(BP).

Combining can be by adding or subtracting the PR1-number with the PR2-number. Accordingly, circuit 809 can include an adder or a subtractor, respectively.

In some embodiments, combining the PR1-number and the PR2-number in divider 846 yields the BP-number directly. Accordingly, circuit 809 outputs signal S(BP).

In other embodiments, combining the PR1-number and the PR2-number in divider 846 yields an intermediate number INT-number, which is further used to derive the BP-number. The INT-number can be conveyed in a number of ways, such as by a signal S(INT). In those embodiments, divider 846 can also include an adjuster 814. Adjuster 814 can perform a further operation on the INT-number, so as to derive the BP-number. For example, adjuster 814 can receive signal S(INT), and output signal S(BP). Sample operations for adjuster 814 are described later in this document.

In performing the division of the L-number by the divide ratio DR, a rounding error may have occurred, as it is required that the result be an integer. The manifestation of the error will be where bits are truncated, as was described in copending U.S. patent application Ser. No. 11/114,614

Divider 846 optionally further includes an offset adder 816. Offset adder 816 can be used for adding an offset to the PR1-number, the PR2-number, the INT-number, the BP-number, and so on. The offset can be positive or negative, and be applied to correct for problems that may arise from the rounding error described above.

Block 844 can include a memory 849. Memory 849 can store any one of these numbers, such as the PR1-number, the PR2-number, the INT-number, the BP-number, and so on. Memory 849 could further be configured to also store a leading or following zero if necessary, as arising from bits being shifted. Memory 849 can include a register, a latch, a nonvolatile memory cell, a nonvolatile memory circuit, a volatile memory cell, a programmable logic array (PLA), an EPROM, an EEPROM, etc.

In some embodiments, processing block 844 is further arranged to adjust the determined backscatter period if an error condition is met. For example, the error condition can be that the backscatter period is larger than a maximum or smaller than a minimum.

It will be appreciated that the PR1-number and the PR2-number can be chosen to implement a desired divide ratio. Many choices are possible. For example, either the PR1-number or the PR2-number or both can be chosen to be substantially equal to the L-number. Accordingly, the corresponding signal S(PR1) or S(PR2) or both can be derived from the signal S(L).

In some embodiments, divider 846 also includes a first generator 805, also known as S(PR1) Generator 805. Divider 846 can also optionally include a second generator 807, also known as S(PR2) Generator 807 respectively. Generator 805 generates signal S(PR1) from signal S(L). Generator 807 generates signal S(PR2), either from signal S(L), or from signal S(PR1). Of course, either one is optional if one of the first versions and the second versions equals the L-number exactly.

Generators 805 and 807 can work in suitable ways, according to the intended result. For example, in some embodiments, generator 805 can determine the PR1-number by selecting bits of the L-number. For example, it can select most of them, shift them, change some, and so on. For another example, generator 807 can determine the PR2-number from the PR1-number determined by generator 805. In some embodiments, the PR1-number is substantially equal to the PR2-number. So, generators 805 and 807 may be implemented as registers, shift registers, transmission lines, counters, and the like.

An advantageous group of embodiments is now described, where the first and second versions of the L-number are multiplicative factors of the L-number.

Figure 9:
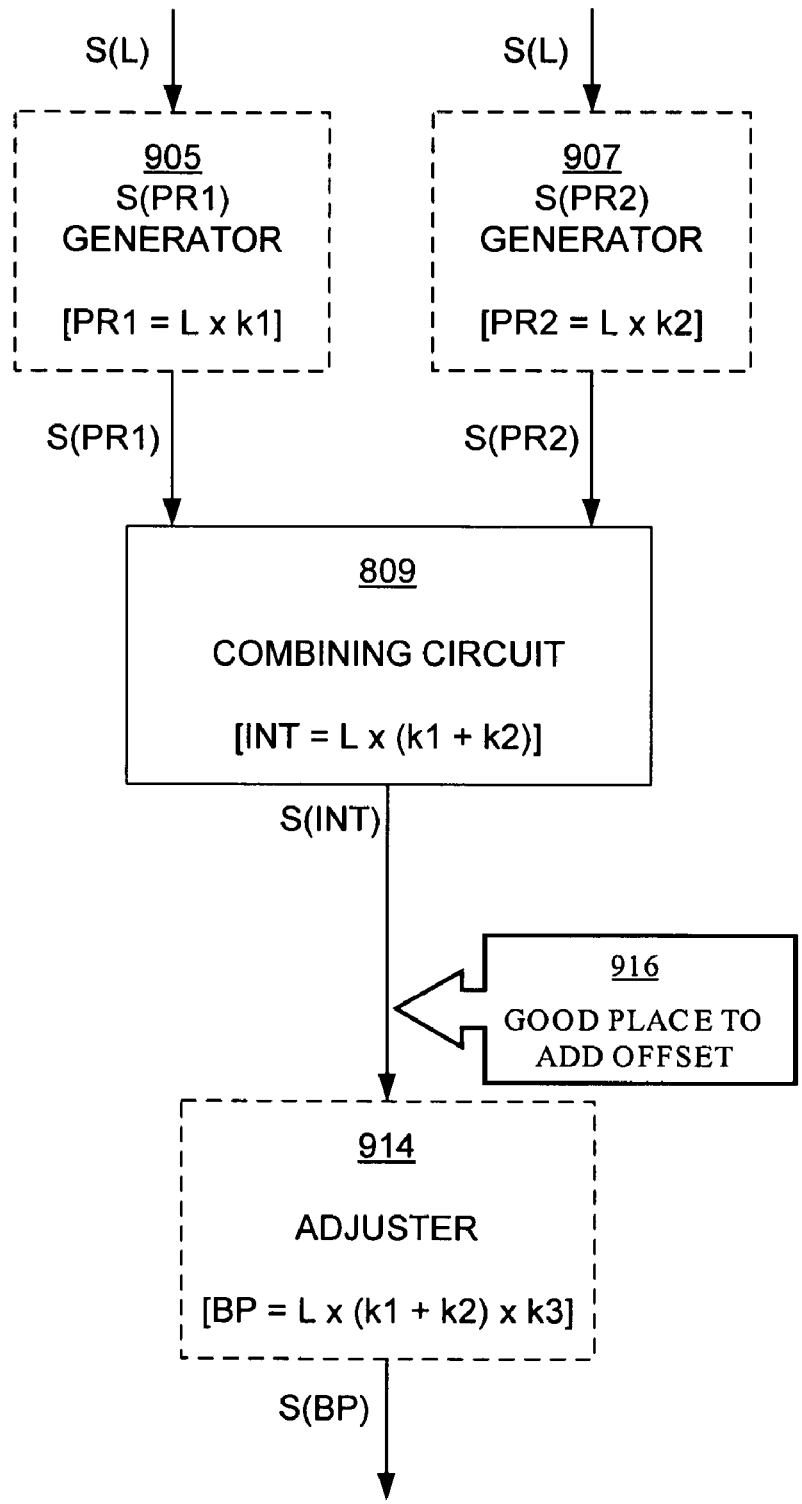
FIG. 9 is a block diagram of a divider such as a divider of FIG. 8, according to embodiments where versions of an L-number are its multiplicative factors.

FIG. 9 is a block diagram of a divider 946, according to embodiments. Divider 946 is made as divider 846, except that the first and second versions of the L-number are multiplicative factors of the L-number.

Divider 946 includes a combining circuit 809, made as described above with reference to FIG. 8. Divider 946 also includes one or both of an S(PR1) Generator 905 and an S(PR2) Generator 907. Generator 905 generates signal S(PR1) from signal S(L). Generator 907 generates signal S(PR2), either from signal S(L) or from signal S(PR2).

The PR1-number determined by generator 905 is a multiple of the L-number by a first factor k1. The PR2-number determined by generator 907 is a multiple of the L-number by a second factor k2. Of course, factors k1, k2 can be less than 1. In some instances, where subtraction is considered, one of them can be considered as negative, and so on. These result in a number of possible operations, as is described in more detail below.

In some embodiments, combining the PR1-number and the PR2-number in divider 946 yields the BP-number directly. Accordingly, circuit 809 outputs signal S(BP).

In other embodiments, combining the PR1-number and the PR2-number in divider 946 yields an intermediate number INT-number, which is further used to derive the BP-number. In those embodiments, divider 946 can also include an adjuster 914. Adjuster 914 can be similar to adjuster 814, except that the BP-number is a multiple of the INT-number by a third factor k3. Of course, factor k3 can be less than 1.

In FIG. 9, a comment 916 indicates where is a good place to add or subtract an offset, especially where factor k3 is a division. The offset can be added by an offset adder, such as offset adder 816 described above.

Generators 905, 907 and adjuster 914 can be implemented in any suitable way to implement the multiplicative factors k1, k2, k3. For example, if k1 is to equal 2, generator 905 can be simply an adder that receives signal S(L) twice, and adds. The result will be S(PR1) for a PR1-number that equals twice the L-number.

In addition, the relationship between factors k1, k2, k3 can be such that many divide ratios can be achieved, even non-integer ones. The full range of possibilities is described below.

FIGS. 10A and 10B are portions 1010, 1020 respectively of a table illustrating divide ratios (DRs) achievable by proper design of divider 946. Portions 1010, 1020 have columns for k1, also shown as PR1/L; k2, also shown as PR2/L; INT/L; BP/L; and the achieved divide ratios L/BP.

Row RG1 describes the general case of divider 946. The achieved DR is $1/[(k1+k2) \times k3]$. The advantage is that if a divide ratio can be expressed as that, then it is achievable by divider 946.

Rows RG2, RG3, RG4 show achievable divide ratios of particular subsets of row RG1, where a component of divider 946 can be advantageously omitted. In row RG2 generator 905 is omitted, in row RG3 generator 907 is omitted, and in row RG4 adjuster 914 is omitted.

Embodiments for divider 946 use factors k1, k2, k3 that are powers of the number 2. In other words, these factors can take values that are multiples of 2, or ½. It will be of course recognized that the number 1 is the zeroth power of two.

Row RS1 describes the case where factors k1, k2, k3 are respectively the mth, nth, and pth powers of 2. Here m, n and p are integers that can be positive or negative.

For these embodiments, divider 946 can be made using shifters for one or more of generator 905, generator 907, and adjuster 914. For example, generator 905 can include a shifter that can shift bits of the L-number to derive the PR1-number, generator 907 can include a shifter that can shift bits of the L-number or the PR1-number to derive the PR2-number, and adjuster 914 can include a shifter that can shift bits of the INT-number to derive the BP-number.

A shifter can operate on a binary number by shifting its bits, which results in multiplying or dividing the number by a power of 2. For example a shifter for the mth power shifts the bits by m spaces. If m=0 there is no shifting. If m>0 there is multiplication, and the shifter left-shifts the bits of the number, and can add trailing zeros as necessary. If m<0 there is division, and the shifter right-shifts the bits of the number, and can add leading zeros as necessary. Of course, the division may not be exact, since the result needs to be an integer binary number, so the remainder (if any) may be truncated.

Using shifters is advantageous, because a shifter does not require an extra component, such as is required for example for adding. In addition, with proper planning, one of the factors k1, k2, k3 equals 1, and there is no shifting necessary. Examples are now described.

Rows RS2, RS3, RS4 show achievable divide ratios of particular subsets of row RS1, where a component of divider 946 can be advantageously omitted. In row RS2 generator 905 is omitted, in row RS3 generator 907 is omitted, and in row RS4 adjuster 914 is omitted.

In particular, row RS4 suggests that any divide ratio DR can be accommodated, as long as it can be expressed by:

$$DR = 1/(2^m + 2^n) \qquad \text{Equation (1)}$$

where m and n are the above described positive or negative integers.

FIG. 11 is a table 1100 illustrating particular achievable divide ratios (DRs) according to Equation (1) for various values of n and m. Column 1102 illustrates some values for n, and column 1104 shows several values for m, for each value of n. Column 1106 illustrates the corresponding set of DR values based on Equation 1. These values are not exhaustive, and different values of n and m can be tried, to achieve even more divide ratios DR.

An observation from table 1100 is that the values shown for m and n are negative, but that only means right-shifting as opposed to left shifting. They are negative because they ultimately have to accommodate the division mandated by the divide ratio. Positive numbers can also be used, especially if followed by an adjuster that will divide back.

Another observation from table 1100 is that a desired divide ratio DR of 64/3 can be attained when n=−6 and m=−5. Achieving this ratio is described now in more detail.

Returning to FIG. 10B, different ways are shown of achieving a desired divide ratio DR of 64/3. According to row RP1, a nonzero integer k0 is considered. The desired divide ratio can be achieved by making k1=k0, k2=k0/2, and k3=1/(32×k0). This can operate for many values of k0.

Rows RP2, RP3, RP4 show how the same ratio of 64/3 can be achieved by particular subsets of row RP1, where using an appropriate value for k0 can advantageously avoid using a component of divider 946. Setting k0=1 in row RP2 can avoid using generator 905, setting k0=2 in row RP3 can avoid using generator 907, and setting k0=1/32 in row RP4 can avoid using adjuster 914. Two sample operations are now given according to row RP4.

Figure 12A:
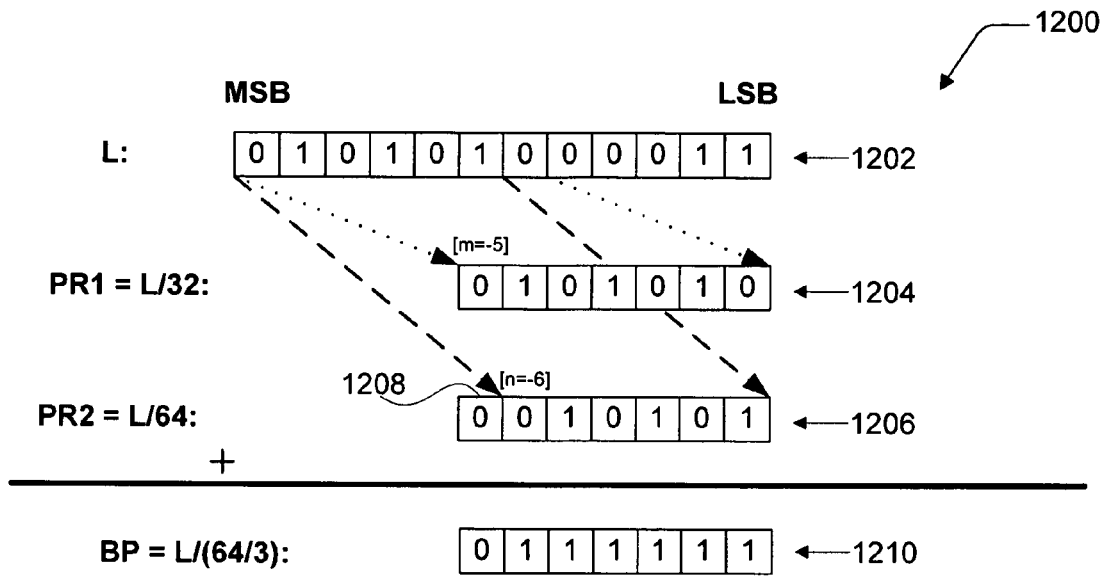
FIG. 12A illustrates an operation of the components of the divider of FIG. 9 according to an embodiment.

FIG. 12A illustrates a sample operation 1200 of the components of divider 946. A sample L-number 1202 is given. L-number 1202 is binary, i.e. given in terms of 1s and 0s, and it is shown with the Most Significant Bit (MSB) to the left and the Least Significant Bit (LSB) to the right.

A PR1-number 1204 is derived from the L-number 1202 by shifting L by m=−5 bits. Again, the minus sign is because of right-shifting as opposed to left-shifting. PR1-number 1204 thus substantially equals 1/32 of the L-number, ignoring the truncation of any remainder.

A PR2-number 1206 is derived from the L-number 1202 by shifting L by n=−6 bits. PR2-number 1206 thus equals 1/64 of the L-number. A leading zero (1208) can be prepended to the PR2-number 1206, without changing its value.

Then PR1-number 1204 and PR2-number 1206 are combined by being added together. The combination results in BP-number 1210. BP-number 1210 substantially equals L/32+L/64=L/(64/3).

Figure 12B:
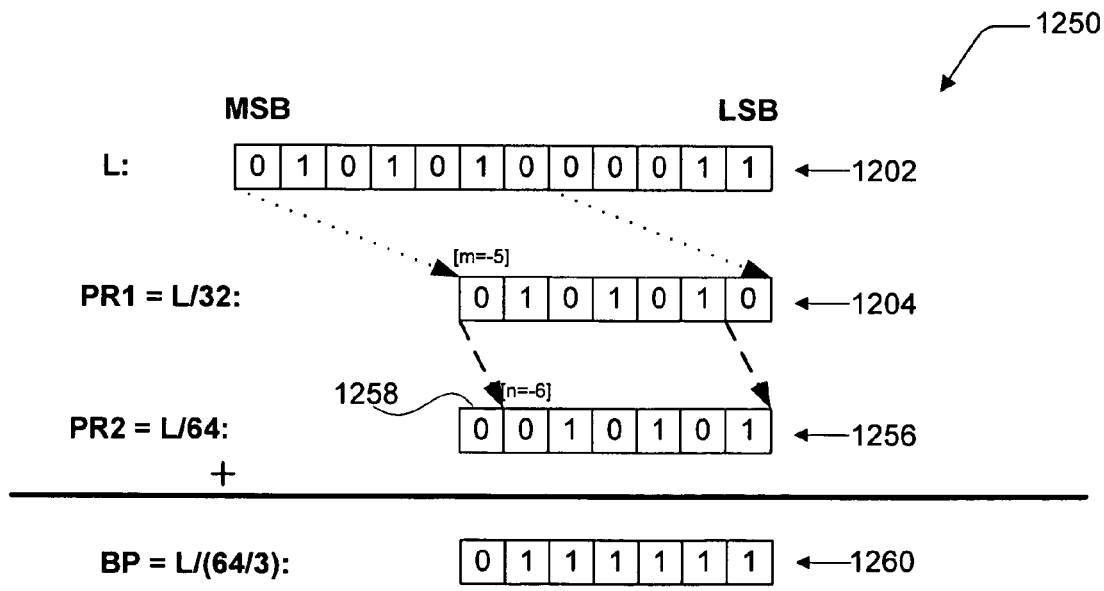
FIG. 12B illustrates an operation of the components of the divider of FIG. 9 according to another embodiment.

FIG. 12B illustrates another sample operation 1250 of the components of divider 946, which starts from the same L-number 1202. PR1-number 1204 is derived the same way as in the above described sample operation.

A PR2-number 1256 is generated by selecting bits of the PR1-number 1204. It should be remembered that the bits of PR1-number 1204 were selected from the bits of the L-number 1202 in the first place. PR2-number 1256 is derived from PR1-number 1204 by right-shifting by 1 more bit. PR2-number 1256 thus equals 1/64 of the L-number, which further is the same as PR2-number 1206 of example 1200. A leading zero (1258) can be prepended to the PR2-number 1256, without changing its value.

Then PR1-number 1204 and PR2-number 1256 are combined by being added together. The combination results in BP-number 1260, which equals BP-number 1210 of operation 1200.

Returning to FIG. 10B, one more way is shown of achieving the desired divide ratio DR of 64/3. According to row RPN, a factor k1 of 4 can be implemented, e.g. by left-shifting by two bits. A factor k2 of 1 can be implemented by omitting generator 907. In addition, circuit 809 is implemented as a digital subtractor, and factor k3 can be implemented as 1/64.

Figure 13:
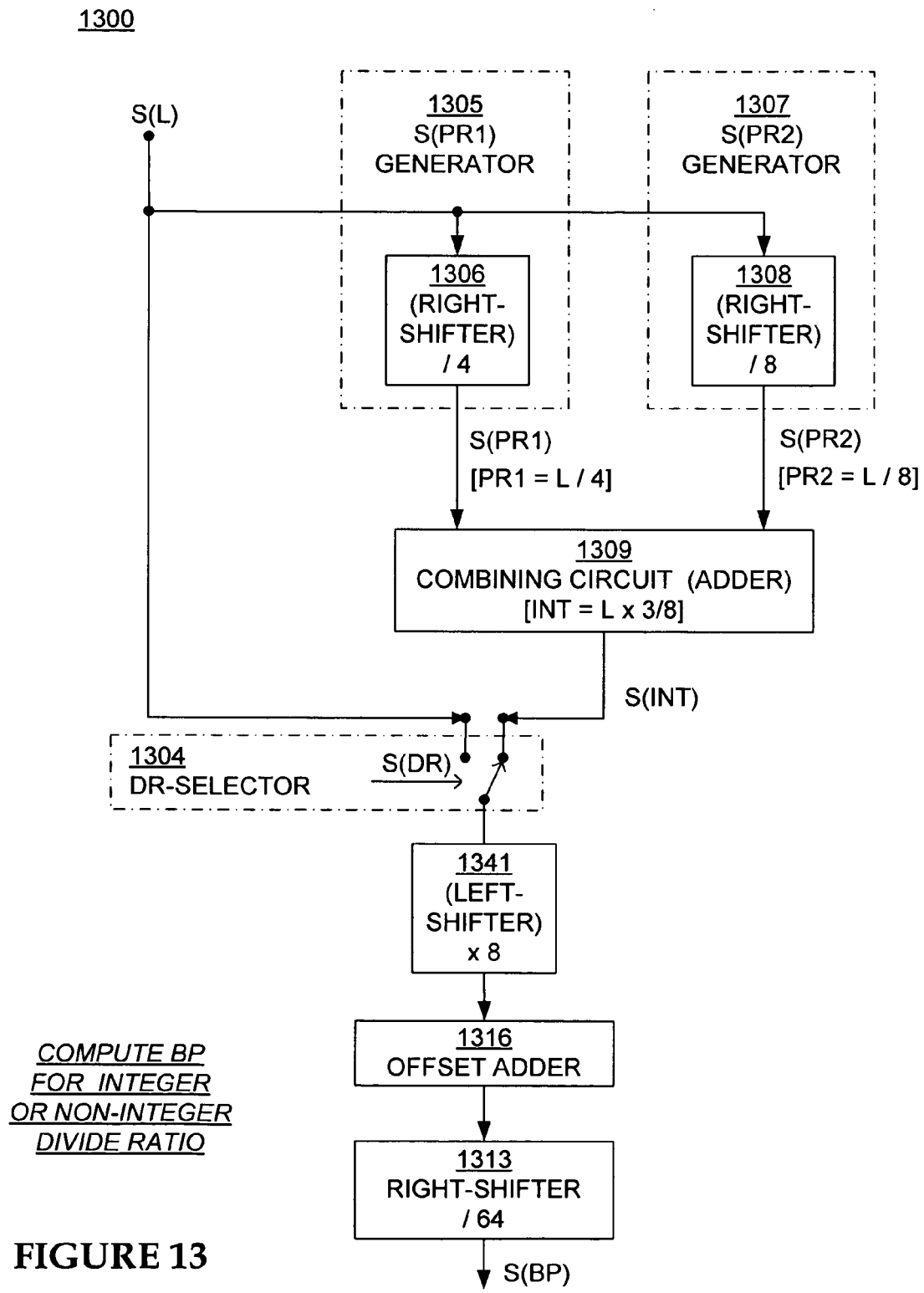
FIG. 13 is a partial block diagram of components such as the components of FIG. 8, and which can perform two divisions according to embodiments.

FIG. 13 is a partial block diagram 1300 of components of a circuit that can perform two divisions according to embodiments. One of the divisions is for a divide ratio DR of 8, and the other for a divide ratio DR of 64/3. This is particularly advantageous for implementing the requirements of the above mentioned Gen2 Spec.

Components 1300 include a left-shifter 1341 and a right shifter 1313, which together implement a DR of 8. In particular, left-shifter 1341 implements a ×8 operation, and right shifter 1313 implements a /64 operation. Together, this results in 8/64=1/8. Signal S(BP) can emerge from right shifter 1313.

Components 1300 also include offset adder 1316, interposed between left-shifter 1341 and right shifter 1313, as is preferred. In one embodiment, a good value for adder 1316 to add is 72 in binary form. First, this is a good value, as it equals 8×9, which is found to give good results. Second, 72 in binary form is expressed as 1001000, which permits a very simple addition, since it has so many zeros.

Components 1300 include a DR-selector 1304 that can be controlled by the instructed divide ratio. When the divide ratio DR is to be 8, DR-selector 1304 can channel into left-shifter 1341 directly the L-number, conveyed via signal S(L). When the divide ratio DR is to be 64/3, DR-selector 1304 can channel into left-shifter 1341 a signal S(INT) generated as described below.

Components 1300 also include an S(PR1) Generator 1305, which includes a right-shifter 1306. Shifter 1306 receives the L-number, and right-shifts it by 2 bits, which effectuates a division by 4, to generate the PR1-number. Signal S(PR1) is therefore generated, which conveys the PR1-number.

Components 1300 additionally include an S(PR2) Generator 1307, which includes a right-shifter 1308. Shifter 1308 receives the L-number, and right-shifts it by 3 bits, which effectuates a division by 8, to generate the PR2-number. Signal S(PR2) is therefore generated, which conveys the PR2-number.

Components 1300 moreover include a combining circuit 1309, which is implemented as an adder 1309. Circuit 1309 receives signals S(PR1) and S(PR2), and outputs signal S(INT), which conveys an INT-number. Circuit 1309 adds the PR1-number (L/4) and the PR2-number (L/8) to arrive at the INT-number (L×3/8).

So, when the divide ratio DR is to be 64/3, the INT-number (L×3/8) is used to derive the BP-number, by effectively dividing by another 8 from the combination of left-shifter 1341 and right-shifter 1313. Then the BP-number equals L×3/64.

Another observation is that the divider of FIG. 9 can be used for integer division. This can be confirmed first from table 1100, when n equals m, which reflects the instance where the PR2-number equals the PR1-number. It can also be confirmed for a divide ratio of 8 as per the below.

Returning to FIG. 10B, different ways are shown of achieving a desired divide ratio DR of 8 by divider 946. According to row RE1, factors k1 and k2 can equal a nonzero integer k0, and factor k3 can equal 1/(16×k0).

Row RE2 is for using shifters, namely making factors k1, k2 equal to 1/16. Factor k3 can be made equal to 1, thus obviating the need for adjuster 914. The operation is described below.

Figure 14:
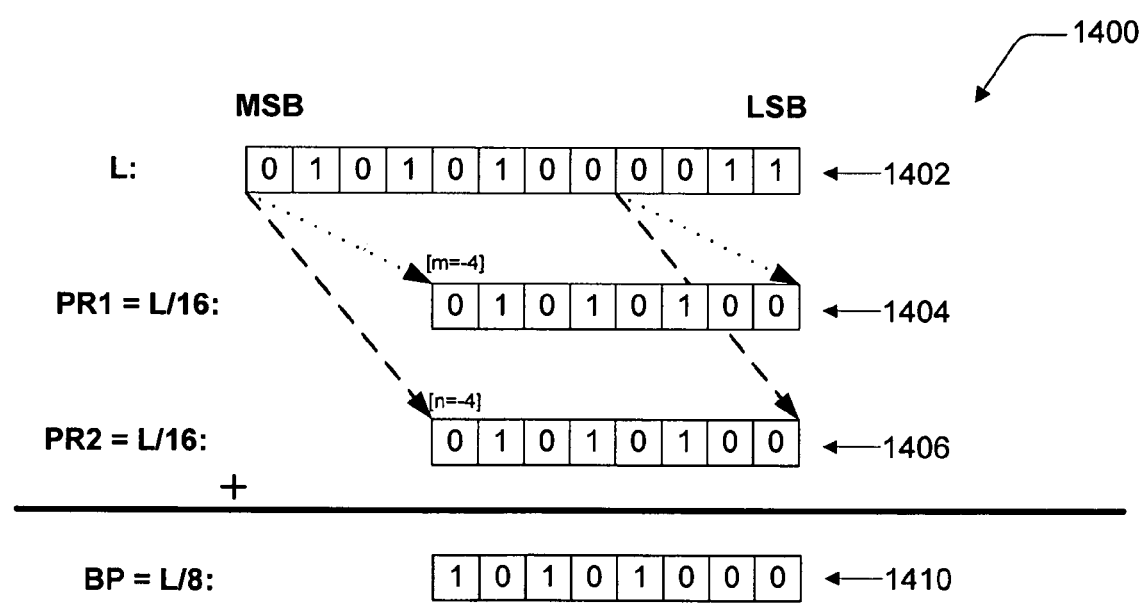
FIG. 14 illustrates an operation of the divider of FIG. 9, this time for dividing by an integer divide ratio.

FIG. 14 illustrates a sample operation 1400 of divider 946, this time dividing by an integer divide ratio DR of 8. Dividing starts from an L-number 1402. Here both n and m are set equal to −4. So, a PR1-number 1404 is derived from L-number 1402 by right-shifting L by m=−4 bits. The PR1-number 1404 thus equals 1/16 of the L-number. A PR2-number 1406 is derived from L-number 1402 by right-shifting L by n=−4 bits. The PR2-number 1406 thus equals 1/16 of the L-number, and thus also equals PR1-number 1404. Then PR1-number 1404 and PR2-number 1406 are combined by being added together. The combination results in BP-number 1410, which equals L/16+L/16=L/8. This is an indirect way of implementing a divide ratio of 8. A more direct but wholly equivalent way for the integer-division would be to remove the last three bits of the L-number, which could be done by an estimator, such as estimator 886 of FIG. 8.

Figure 15:
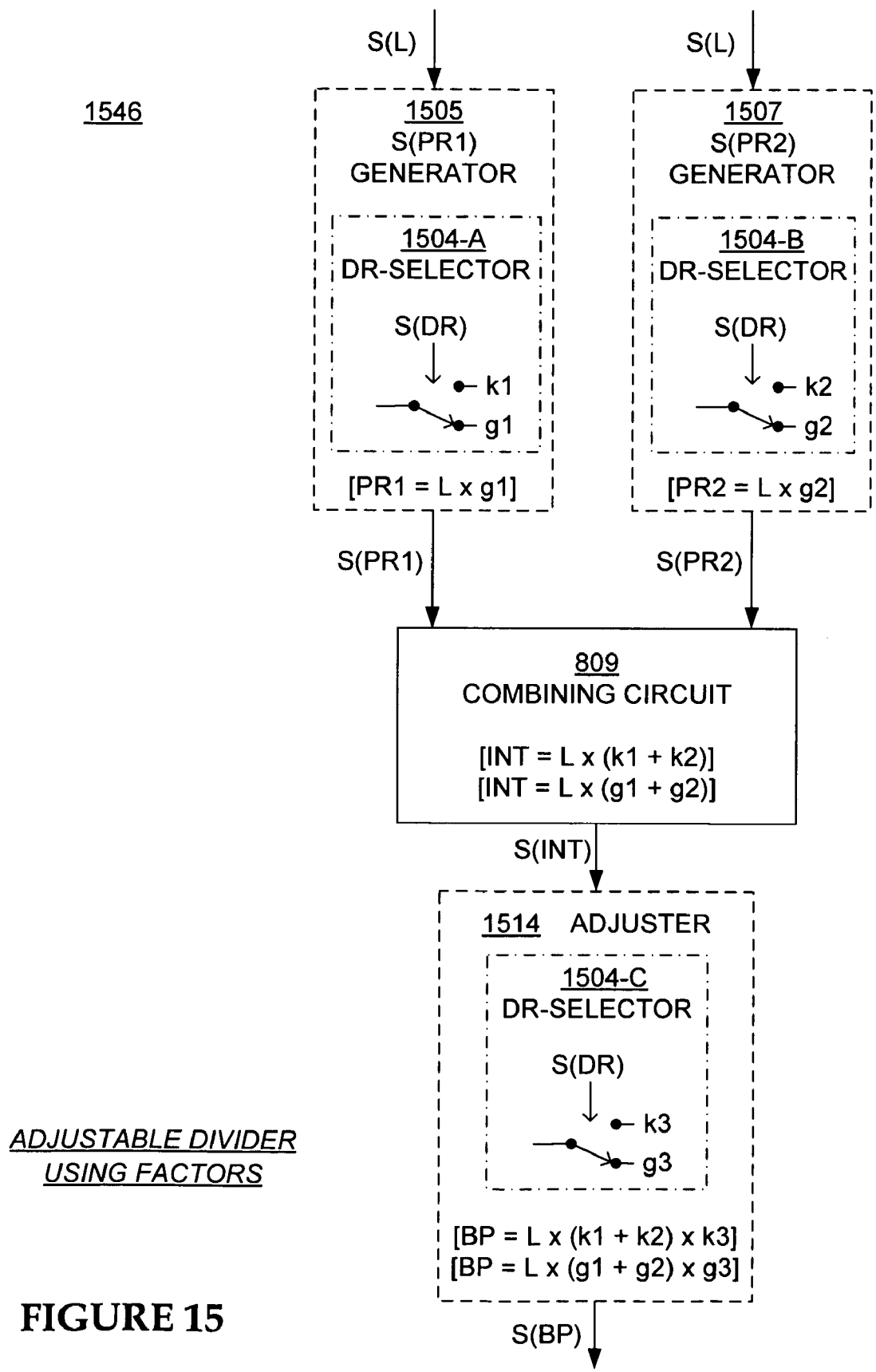
FIG. 15 is a block diagram of an adjustable divider according to embodiments that can perform the operations of both FIG. 12A and FIG. 14.

FIG. 15 is a block diagram of an adjustable divider 1546 according to embodiments. Divider 1546 includes a combining circuit 809, as does divider 846 of FIG. 8. In the embodiment of FIG. 15, divider 1546 also includes an S(PR1) Generator 1505, an S(PR2) Generator 1507, and an adjuster 1514, although other embodiments can be made that omit one or even two of the last three components.

Divider 1546 is adjustable, in that it can be made to divide by different divide ratios. This is accomplished by at least one of the following additional components. S(PR1) Generator 1505 optionally includes DR-selector 1504-A, which can cause generator 1505 to multiply by either a factor k1, as per the above, or by another factor g1. S(PR2) Generator 1507 optionally includes DR-selector 1504-B, which can cause generator 1507 to multiply by either a factor k2, as per the above, or by another factor g2. Adjuster 1514 optionally includes DR-selector 1504-C, which can cause adjuster 1514 to multiply by either a factor k3, as per the above, or by another factor g3. DR-selectors 1504-A, 1504-B, 1504-C can be implemented by multiplexers, and operate responsive to the instructed divide ratio, as per the above.

When divider 1546 is implemented in this adjustable form, then there is no need for a separate standalone estimator, such as estimator 886. Regardless of what is the divide ratio, the combining function of circuit 809 is performed.

In one embodiment, therefore, divider 1546 can be made so that it performs operations 1200 and 1400. This corresponds to using divide ratios 64/3 and 8, depending on the instructed divide ratio. More particularly, this would be implemented by having no adjuster 1514, i.e. k3=g3=1. In addition, $k1=2^{-5}$, $k2=2^{-6}$, and $g1=g2=2^{-4}$.

Figure 16:
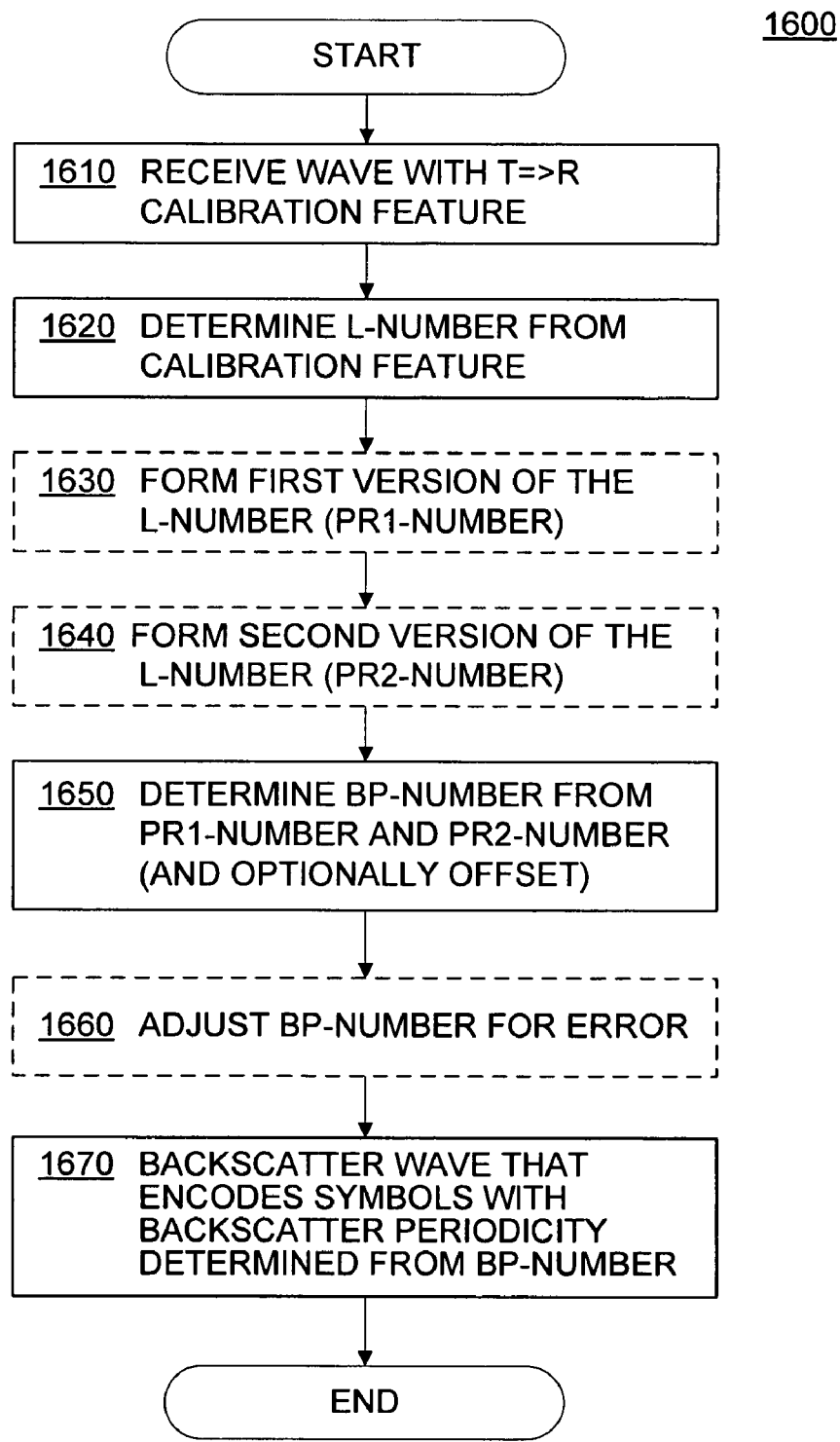
FIG. 16 is a flowchart illustrating a method for an RFID tag according to embodiments.

FIG. 16 is a flowchart 1600 illustrating a method for an RFID tag according to embodiments. The method of flowchart 1600 may-be implemented by an RFID tag according to embodiments, such as RFID tag 120 of FIG. 1, when it follows an instruction about the period of the symbols it is to backscatter.

According to an operation 1610, a wave is received, such as wave 112. Wave 112 in this instance has a waveform that includes a calibration feature, such as TRcal 638 described in FIG. 6A.

According to a next operation 1620, an L-number is determined from a duration of the calibration feature. The L-number can be derived as described above.

According to an optional next operation 1630, a PR1-number is formed by selecting bits of the L-number. The PR1-number can be formed as described above.

According to an optional next operation 1640, a PR2-number is formed by selecting bits of the L-number. The PR2-number can be formed as described above.

According to a next operation 1650, a BP-number is derived from the PR1-number and the PR2-number. The BP-number can be derived as described above. In addition, the BP-number can be optionally offset as per the above.

According to an optional next operation 1660, the BP-number can adjusted if an error condition is met.

According to a next operation 1670, a wave is backscattered that encodes symbols with a backscatter periodicity determined from the BP-number. Details for this operation have been given above.

In the above, the order of operations is not constrained to what is shown, and different orders may be possible. In addition, actions within each operation can be modified, deleted, or new ones added without departing from the scope and spirit of the invention. Plus other, optional operations and actions can be implemented with these methods, as will be inferred from the earlier description.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub combinations of elements, features, steps, and/or functions, which are regarded as novel and non-obvious. Additional claims for other combinations and subcombinations may be presented in this or a related document.

What is claimed is:

1. A circuit for a radio frequency identification (RFID) tag, comprising:
   a demodulator that is arranged to demodulate a waveform of a wirelessly received wave;
   a processing block that includes:
   a counter configured to determine an L-number from a duration of a calibration feature of the waveform, and
   a combining circuit configured to combine a first nonzero version of the L-number with a second nonzero version of the L-number so as to derive a BP-number such that the derived BP-number substantially equals the L-number divided by a preset non-integer divide ratio; and
   a modulator that is arranged to modulate a second wave with encoded symbols that have a periodicity determined from the BP-number.

2. The circuit of claim 1, wherein
   a variable M assumes a value from a set that includes 1, 2, 4, and 8, and
   the symbols are encoded with the periodicity shown in FIG. 7A of this document according to the assumed value of the variable M.

3. The circuit of claim 1, wherein
   the counter is arranged to:
   receive a train of substantially periodic pulses; and
   count features of the pulses during the calibration feature to determine the L-number.

4. The circuit of claim 1, further comprising:
   a selector adapted to establish a first computation setting out of at least a first and a second available computation settings according to the divide ratio, and
   wherein a first result is derived for the BP-number if the first computation setting is established, and a second result different from the first result is derived for the BP-number if the second computation setting is established.

5. The circuit of claim 4, wherein the selector comprises at least one multiplexer.

6. The circuit of claim 4, wherein if the second computation setting is established, the BP-number is derived by the combining.

7. The circuit of claim 6, wherein the second result is such that the derived BP-number substantially equals the L-number divided by a preset integer divide ratio.

8. The circuit of claim 4, wherein the processing block further includes an estimator, and if the second computation setting is established, the BP-number is derived by using the estimator without the combining.

9. The circuit of claim 1, wherein the combining circuit comprises an adder operable to add the first version to the second version.

10. The circuit of claim 1, wherein the combining circuit comprises a subtractor operable to subtract the second version from the first version.

11. The circuit of claim 1, wherein combining the first version with the second version results in an intermediate number, and the processing block further comprises a shifter operable to shift bits of the intermediate number to derive the BP-number.

12. The circuit of claim 1, wherein the processing block further comprises an offset adder operable to add an offset to one of the first version, the second version, and the BP-number.

13. The circuit of claim 1, further comprising: a memory operable to store at least one of the first version, the second version, and the BP-number.

14. The circuit of claim 1, wherein one of the first version and the second version is substantially equal to the L-number.

15. The circuit of claim 1, wherein the processing block further comprises a first generator for generating a signal that conveys the first version responsive to a signal that conveys the L-number, and wherein the first generator is adapted to determine the first version by selecting bits of the L-number.

16. The circuit of claim 15, wherein the processing block further comprises a second generator for generating a signal that conveys the second version responsive to a signal that conveys the L-number.

17. The circuit of claim 16, wherein the second generator is adapted to determine the second version by selecting bits of the first version.

18. The circuit of claim 1, wherein the first version is substantially equal to the second version.

19. The circuit of claim 1, wherein the first version substantially equals the L-number times a first factor, and the second version substantially equals the L-number times a second factor.

20. The circuit of claim 19, wherein the first factor equals twice the second factor.

21. The circuit of claim 19, wherein the first factor equals a first power of 2.

22. The circuit of claim 21, wherein the second factor equals a second power of 2.

23. The circuit of claim 21, wherein the processing block further comprises a shifter operable to shift bits of the L-number to derive the first version.

24. The circuit of claim 23, wherein the shifter is operable to left-shift the bits of the L-number.

25. The circuit of claim 23, wherein the shifter is operable to right-shift the bits of the L-number.

26. The circuit of claim 1, wherein the processing block is further arranged to adjust the determined BP-number if an error condition is met.

27. The circuit of claim 26, wherein the error condition is that the determined BP-number is larger than a maximum.

28. The circuit of claim 26, wherein the error condition is that the determined BP-number is smaller than a minimum.

29. A radio frequency identification (RFID) tag, comprising:
an antenna arranged to receive a wireless wave;
a demodulator arranged to demodulate a waveform of the wirelessly received wave;
a processing block that includes:
    a counter configured to determine an L-number from a duration of a calibration feature of the waveform, and
    a combining circuit configured to combine a first nonzero version of the L-number with a second nonzero version of the L-number so as to derive a BP-number such that the derived BP-number substantially equals the L-number divided by a preset non-integer divide ratio; and
a modulator that is arranged to backscatter via the antenna a wave with modulation that encodes symbols that have a periodicity determined from the BP-number.

30. The tag of claim 29, wherein the counter is arranged to:
receive a train of substantially periodic pulses; and
count features of the pulses during the calibration feature to determine the L-number.

31. The tag of claim 29, further comprising:
a selector adapted to establish a first computation setting out of at least a first and a second available computation settings according to the divide ratio, and
wherein a first result is derived for the BP-number if the first computation setting is established, and a second result different from the first result is derived for the BP-number if the second computation setting is established.

32. The tag of claim 31, wherein if the second computation setting is established, the BP-number is derived by the combining.

33. The tag of claim 32, wherein the second result is such that the derived BP-number substantially equals the L-number divided by a preset integer divide ratio.

34. The tag of claim 31, wherein the processing block further includes an estimator, and if the second computation setting is established, the BP-number is derived by using the estimator without the combining.

35. The tag of claim 29, wherein the combining circuit comprises an adder operable to add the first version to the second version.

36. The tag of claim 29, wherein
combining the first version with the second version results in an intermediate number, and
the processing block further comprises a shifter operable to shift bits of the intermediate number to derive the BP-number.

37. The tag of claim 29, wherein
the processing block further comprises an offset adder operable to add an offset to one of the first version, the second version, and the BP-number.

38. A circuit for a radio frequency identification (RFID) tag that is responsive to an RFID reader, the RFID tag comprising:
a means for demodulating a waveform from a first wireless wave received from the reader;
a means for determining an L-number from a duration of a calibration feature of the waveform;
a means for deriving a BP-number by combining a first nonzero version of the L-number with a second nonzero version of the L-number such that the derived BP-number substantially equals the L-number divided by a preset non-integer divide ratio; and
a means for modulating a second wave that is to be received by the reader by encoding symbols with a periodicity determined from the BP-number.

39. The circuit of claim 38, wherein
the deriving means comprises adding means for adding the first version with the second version.

40. The circuit of claim 38, wherein
the deriving means comprises subtracting means for subtracting the second version from the first version.

41. The circuit of claim 38, wherein
combining the first version with the second version results in an intermediate number, and
further comprising means for adjusting the intermediate number to derive the BP-number.

42. The circuit of claim 38, further comprising:
means for adding an offset to one of the first version, the second version, and the BP-number.

43. The circuit of claim 38, further comprising:
means for storing at least one of the first version, the second version, and the BP-number.

44. The circuit of claim 38, wherein
one of the first version and the second version is substantially equal to the L-number.

45. The circuit of claim 38, wherein
one of the first version and the second version is generated by selecting bits of the L-number.

46. The circuit of claim 38, wherein
the second version is generated by selecting bits of the first version.

47. The circuit of claim 38, wherein
the first version is substantially equal to the second version.

48. The circuit of claim 38, wherein
the first version substantially equals the L-number times a first factor, and
the second version substantially equals the L-number times a second factor.

49. The circuit of claim 48, wherein
the first factor equals twice the second factor.

50. The circuit of claim 48, wherein
the first factor equals a first power of 2.

51. The circuit of claim 50, wherein
the second factor equals a second power of 2.

52. The circuit of claim 50, further comprising:
means for deriving the first version by shifting bits of the L-number.

53. A method for an RFID tag, comprising:
receiving a first wireless wave having a waveform;
determining an L-number from a duration of a calibration feature of the waveform;
deriving a BP-number by combining a first nonzero version of the L-number with a second nonzero version of the L-number such that the derived BP-number substantially equals the L-number divided by a preset non-integer divide ratio; and
modulating a second wave that encodes symbols with a periodicity determined from the BP-number.

54. The method of claim 53, wherein
a variable M assumes a value from a set that includes 1, 2, 4, and 8, and
the symbols are encoded with the periodicity shown in FIG. 7A of this document according to the assumed value of the variable M.

55. The method of claim 53, further comprising:
receiving a train of substantially periodic pulses; and
counting features of the pulses during the calibration feature to determine the L-number.

56. The method of claim 53, further comprising:
establishing a first computation setting out of at least a first and a second available computation settings according to the divide ratio, and
wherein a first result is derived for the BP-number if the first computation setting is established, and a second result different from the first result is derived for the BP-number if the second computation setting is established.

57. The method of claim 56, wherein
if the second computation setting is established, the BP-number is derived by the combining.

58. The method of claim 57, wherein
the second result is such that the derived BP-number substantially equals the L-number divided by a preset integer divide ratio.

59. The method of claim 56, wherein
if the second computation setting is established, the BP-number is derived without the combining.

60. The method of claim 53, wherein
combining comprises adding the first version with the second version.

61. The method of claim 53, wherein
combining comprises subtracting the second version from the first version.

62. The method of claim 53, wherein
combining the first version with the second version results in an intermediate number, and
further comprising adjusting the intermediate number to derive the BP-number.

63. The method of claim 53, further comprising:
adding an offset to one of the first version, the second version, and the BP-number.

64. The method of claim 53, further comprising:
storing at least one of the first version, the second version, and the BP-number.

65. The method of claim 53, wherein
one of the first version and the second version is substantially equal to the L-number.

66. The method of claim 53, wherein
one of the first version and the second version is generated by selecting bits of the L-number.

67. The method of claim 53, wherein the second version is generated by selecting bits of the first version.

68. The method of claim 53, wherein the first version is substantially equal to the second version.

69. The method of claim 53, wherein the first version substantially equals the L-number times a first factor, and the second version substantially equals the L-number times a second factor.

70. The method of claim 69, wherein the first factor equals twice the second factor.

71. The method of claim 69, wherein the first factor equals a first power of 2.

72. The method of claim 71, wherein the second factor equals a second power of 2.

73. The method of claim 71, further comprising: deriving the first version by shifting bits of the L-number.

74. The method of claim 73, wherein shifting is performed by left-shifting bits of the L-number.

75. The method of claim 73, wherein shifting is performed by right-shifting bits of the L-number.

76. The method of claim 53, further comprising: adjusting the determined BP-number if an error condition is met.

77. The method of claim 76, wherein the error condition is that the determined BP-number is larger than a maximum.

78. The method of claim 76, wherein the error condition is that the determined BP-number is smaller than a minimum.

* * * * *